US010657172B2

(12) United States Patent
Kim et al.

(10) Patent No.: US 10,657,172 B2
(45) Date of Patent: May 19, 2020

(54) METHOD AND APPARATUS FOR MANAGING IMAGE METADATA

(71) Applicant: Samsung Electronics Co., Ltd., Gyeonggi-do (KR)

(72) Inventors: Kwangyoung Kim, Gyeonggi-do (KR); Yongman Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 477 days.

(21) Appl. No.: 14/988,183

(22) Filed: Jan. 5, 2016

(65) Prior Publication Data

US 2016/0196286 A1 Jul. 7, 2016

(30) Foreign Application Priority Data

Jan. 5, 2015 (KR) .......................... 10-2015-0000682

(51) Int. Cl.
*G06F 16/58* (2019.01)
*G06T 7/11* (2017.01)
*G06F 16/583* (2019.01)

(52) U.S. Cl.
CPC ........ *G06F 16/5866* (2019.01); *G06F 16/583* (2019.01); *G06T 7/11* (2017.01); *G06T 2207/20016* (2013.01); *G06T 2207/20021* (2013.01)

(58) Field of Classification Search
CPC ........... G06F 17/30268; G06F 16/5866; G06F 16/583; G06T 7/11
USPC ................................................. 707/741, 915
See application file for complete search history.

(56) References Cited

U.S. PATENT DOCUMENTS

| 4,742,558 | A | * | 5/1988 | Ishibashi | H04N 1/217 382/240 |
| 6,070,167 | A | * | 5/2000 | Qian | H04N 21/234318 |
| 6,774,898 | B1 | * | 8/2004 | Katayama | G06T 15/00 345/428 |
| 9,048,153 | B2 | * | 6/2015 | Vaillant | H01L 27/14605 |
| 9,092,802 | B1 | * | 7/2015 | Akella | G06Q 30/0256 |
| 9,710,923 | B2 | * | 7/2017 | Ohba | G06T 7/194 |
| 2002/0196467 | A1 | * | 12/2002 | Delhoune | G06K 15/02 358/1.18 |
| 2002/0198885 | A1 | * | 12/2002 | Streepy, Jr. | G06Q 50/22 |
| 2004/0114814 | A1 | * | 6/2004 | Boliek | G06K 9/00463 382/233 |
| 2005/0114356 | A1 | * | 5/2005 | Bhatti | G06F 16/16 |
| 2005/0125419 | A1 | * | 6/2005 | Mizutani | G06F 16/957 |
| 2006/0184576 | A1 | * | 8/2006 | Albert | G06F 16/58 |
| 2008/0175477 | A1 | * | 7/2008 | Ohk | G06K 9/38 382/176 |

(Continued)

*Primary Examiner* — Shahid A Alam
*Assistant Examiner* — Nargis Sultana
(74) *Attorney, Agent, or Firm* — The Farrell Law Firm, P.C.

(57) ABSTRACT

Methods and apparatus for processing images are provided. The image processing method includes obtaining an image using an electronic device; associating first metadata corresponding to the image with a first layer of a hierarchical data structure, wherein the hierarchical data structure includes a plurality of layers, including the first layer and a second layer; associating second metadata with the second layer, wherein the second metadata corresponds to one or more of a plurality of blocks into which the image is divided; and storing the hierarchical data structure in association with the image in a storage unit operatively coupled to the electronic device.

24 Claims, 16 Drawing Sheets

(56) References Cited

U.S. PATENT DOCUMENTS

| | | | | |
|---|---|---|---|---|
| 2009/0119576 A1* | 5/2009 | Pepper | .................. | G06F 17/241 |
| | | | | 715/230 |
| 2010/0005070 A1* | 1/2010 | Moriya | .............. | G06K 9/00711 |
| | | | | 707/E17.001 |
| 2010/0042924 A1* | 2/2010 | Kim | ..................... | H04N 21/235 |
| | | | | 715/716 |
| 2010/0100549 A1* | 4/2010 | Ishida | ..................... | G06F 16/20 |
| | | | | 707/741 |
| 2010/0100819 A1* | 4/2010 | Kim | ..................... | H04N 21/235 |
| | | | | 715/716 |
| 2011/0314246 A1* | 12/2011 | Miller | .................. | G06F 3/0613 |
| | | | | 711/170 |
| 2012/0147426 A1* | 6/2012 | Naka | .................... | G06F 3/1206 |
| | | | | 358/1.18 |
| 2012/0268465 A1* | 10/2012 | Inada | ..................... | G06T 11/00 |
| | | | | 345/428 |
| 2012/0281119 A1* | 11/2012 | Ohba | .................... | H04N 9/8205 |
| | | | | 348/240.2 |
| 2012/0290801 A1* | 11/2012 | Hasegawa | ........... | G06F 16/1748 |
| | | | | 711/159 |
| 2013/0083342 A1* | 4/2013 | Seto | .................... | G06F 16/9038 |
| | | | | 358/1.13 |
| 2014/0002616 A1* | 1/2014 | Ohba | ...................... | G06T 7/194 |
| | | | | 348/47 |
| 2014/0079340 A1* | 3/2014 | Kawano | ............. | H04N 21/8133 |
| | | | | 382/305 |
| 2014/0153634 A1* | 6/2014 | Inada | ..................... | H04N 19/33 |
| | | | | 375/240.01 |
| 2014/0267871 A1* | 9/2014 | Baek | ..................... | H04N 5/2258 |
| | | | | 348/333.05 |
| 2014/0365463 A1* | 12/2014 | Tusk | ....................... | G06F 16/51 |
| | | | | 707/711 |
| 2015/0126288 A1* | 5/2015 | Okino | .............. | G11B 20/10527 |
| | | | | 463/43 |

\* cited by examiner

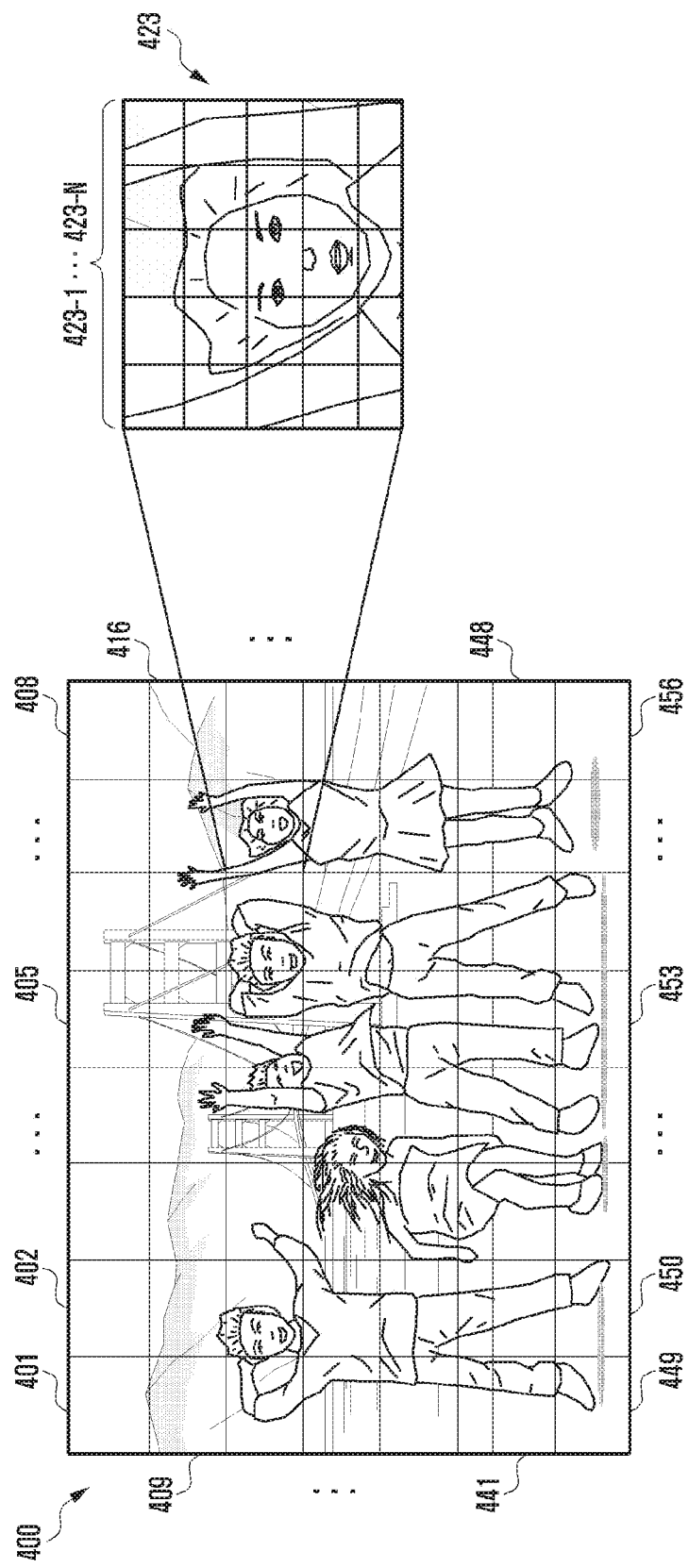

METHOD AND APPARATUS FOR MANAGING IMAGE METADATA

PRIORITY

This application claims priority under 35 U.S.C. § 119(a) to Korean Patent Application filed on Jan. 5, 2015, in the Korean Intellectual Property Office and assigned Serial No. 10-2015-0000682, the entire disclosure of which is incorporated herein by reference.

BACKGROUND

1. Field of the Disclosure

The present disclosure generally relates to a method and apparatus for managing image metadata.

2. Description of the Related Art

Digital images are capable of including data of images (images of pixels, e.g., images for re-configuring images in the bitmap format) and metadata (used for images and for describing image files). Image data may be stored in one of the standard image formats (e.g., JPEG, TIFF, GIF, etc.). Metadata may be stored in one or more fixed metadata schemas (e.g., EXIF, IPTC, XMP, etc.). EXIF is capable of including information about a camera that creates files related to digital photos, information about the photography conditions, etc.

As digital cameras capable of taking digital images have become commonly used and storage devices for storing digital images or photos are now affordable, services for managing digital images have been growing steadily. In addition, there has been an increase in the number of services that enable electronic devices to share or distribute digital images to each other in order to perform the combination or recreation of digital images based on the shared images.

When conventional electronic devices respond to a modification, combination, copy, or distribution of images, they have difficulty in modifying, combining, copying or providing metadata that is stored as part of the images or separately from the images.

SUMMARY

The present disclosure has been made to address at least the above disadvantages and other disadvantages not described above, and to provide at least the advantages described below.

An aspect of the present disclosure provides a metadata management method and apparatus that is capable of easily modifying, combining, copying or providing metadata of images in response to a modification, combination, copy, or distribution of images.

According to an aspect of the present disclosure, a metadata storing method includes obtaining an image using an electronic device; associating first metadata corresponding to the image with a first layer of a hierarchical data structure, wherein the hierarchical data structure includes a plurality of layers, including the first layer and a second layer; associating second metadata with the second layer, wherein the second metadata corresponds to one or more of a plurality of blocks into which the image is divided; and storing the hierarchical data structure in association with the image in a storage unit operatively coupled to the electronic device.

According to an aspect of the present disclosure, a metadata creating method includes based on at least a first image and a second image, creating a third image including at least part of the first image and at least part of the second image; based on metadata of the first image and metadata of the second image, creating metadata of the third image; and storing the metadata of the third image in association with the third image in a storage unit operatively coupled to an electronic device. The metadata of the first image comprises first metadata corresponding to one or more of a plurality of primary blocks into which the first image is divided. The metadata of the third image comprises second metadata corresponding to one or more of a plurality of secondary blocks into which the third image is divided.

According to an aspect of the present disclosure, a metadata providing method includes receiving, by an electronic device, a request message for requesting an image from an external device; obtaining a hierarchical data structure that includes a plurality of layers including at least a first layer and a second layer, wherein the hierarchical data structure is created so that first metadata corresponding to the image is associated with the first layer, and second metadata corresponding to one or more of a plurality of primary blocks into which the image is divided, is associated with the second layer; and transmitting to the external device, metadata associated with at least one layer corresponding to the external device from among the plurality of layers, as at least part of a reply in response to the request, based on information related to the external device.

According to an aspect of the present disclosure, an electronic device includes a module that obtains an image; a data structure creating module that creates a hierarchical data structure that includes a plurality of layers including at least a first layer and a second layer, so that first metadata corresponding to the image is associated with the first layer, and second metadata corresponding to one or more of a plurality of blocks into which the image is divided, is associated with the second layer; and a storage module that stores the hierarchical data structure in association with the image in a storage unit operatively coupled to the electronic device.

According to an aspect of the present disclosure, an electronic device includes an image combining module that creates, based on at least a first image and a second image, a third image including at least part of the first image and at least part of the second image, and that creates metadata of the third image based on metadata of the first image and metadata of the second image; and a storage module that stores the metadata of the third image in association with the third image in a storage unit operatively coupled to the electronic device, wherein the metadata of the first image comprises first metadata corresponding to one or more of a plurality of primary blocks into which the first image is divided; and wherein the metadata of the third image comprises second metadata corresponding to one or more of a plurality of secondary blocks into which the third image is divided.

According to an aspect of the present disclosure, an electronic device includes a module that receives a message requesting an image from an external device; a metadata obtaining module that obtains a hierarchical data structure that includes a plurality of layers including at least a first layer and a second layer, wherein the hierarchical data structure is created so that first metadata corresponding to the image is associated with the first layer, and second metadata corresponding to one or more of a plurality of primary blocks into which the image is divided, is associated with the second layer; and a module that transmits, to the external device, metadata associated with at least one layer corresponding to the external device from among the plurality of layers, as at least part of a reply in response to the request, based on the information related to the external device.

BRIEF DESCRIPTION OF THE DRAWINGS

The above and other aspects, features and advantages of the present disclosure will become more apparent from the following detailed description, taken in conjunction with the accompanying drawings, in which:

FIG. 4 is a diagram of a segmentation of an image in an electronic device according to an embodiment of the present disclosure;

DETAILED DESCRIPTION

Figure 1:
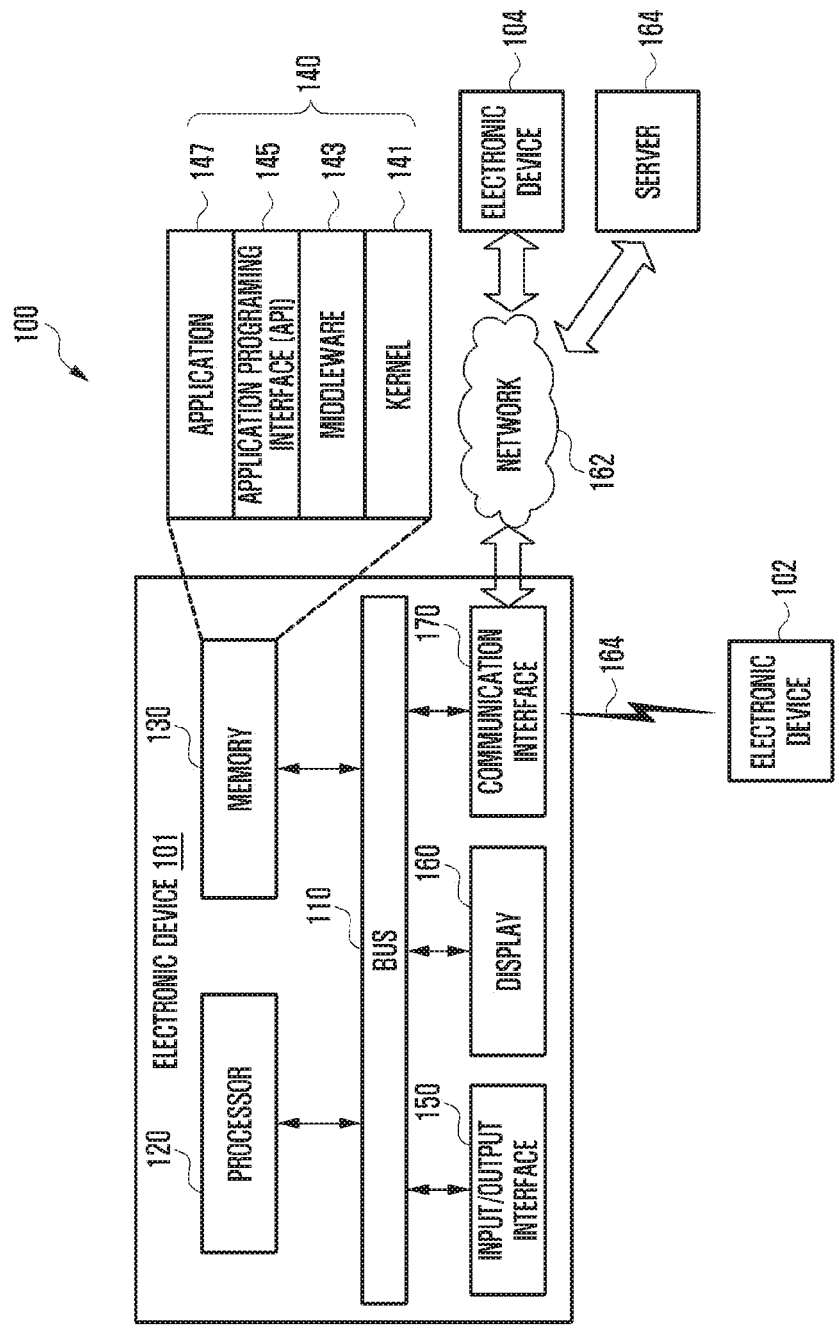
FIG. 1 illustrates a network environment including an electronic device according to an embodiment of the present disclosure.

Embodiments of the present disclosure will be described herein below with reference to the accompanying drawings.

The various embodiments of the disclosure are merely provided to assist in a comprehensive understanding of the present disclosure and are not to be construed as limiting the present disclosure. It should also be understood that the present disclosure includes various modifications, equivalents and/or alternatives from the embodiments presented herein. In the drawings, the same or similar elements are denoted by the same reference numbers.

In the description, the expressions such as "to have," "to be capable of having," "may have," "to include," "includes", "to be capable of including" and "may include" are used to represent the presence of the features (e.g., numerical values, functions, components, etc.) and do not exclude the existence of the additional features.

In the present disclosure, the expression "and/or" includes any and all combinations of the associated listed words. For example, the expression "A or B," "A and at least one of B," "A or at least one of B" may refer to all of the following cases: (1) at least one A; (2) at least one B; and (3) at least one A and at least one B.

In the present disclosure, the expressions including ordinal numbers, such as "first" and "second," etc., and the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be referred to as a second element, and similarly, a second element could also be referred to as a first element without departing from the scope of the present disclosure.

When a component (e.g., a first component) is referred to as being "operatively or communicatively coupled with/to" or "connected to" any other component (e.g., a second component), it should be understood that the component (first component) may be connected/coupled to the other component (second component) directly or via another component (e.g., a third component). In contrast, when a component (e.g., a first component) is referred to as being "directly coupled with/to" or "directly connected to" any other component (e.g., a second component), it should be understood that there is no component (e.g., a third component) between the component (the first component) and the other component (the second component).

In the present disclosure, the expression "configured to do" may be interchangeable with, for example, "suitable for doing," "having the capacity to do," "designed to do" "adapted to do," "made to do," or "capable of doing." The expression "configured to do" may not be used to refer to only something in hardware for which it is "specifically designed to do." Instead, the expression "a device configured to do" may indicate that the device is "capable of doing" something with other devices or parts. For example, the expression "a processor configured to do A, B and C" may refer to a general-purpose processor (e.g., CPU or application processor) or a dedicated processor (e.g., an embedded processor), or one or more software programs stored in a memory device and executed on a processor, to perform the corresponding functions.

The terms used in the present disclosure are only used to describe a particular embodiment and are not intended to limit the scope of other embodiments. Singular forms are intended to include plural forms unless the context clearly indicates otherwise. Unless otherwise defined, all terms including technical and/or scientific terms used herein have the same meaning as commonly understood by one of ordinary skill in the art to which the disclosure pertains. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to an embodiment of the present disclosure may include one or more of a smartphone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MP3 player, a mobile medical device, a camera, a wearable device, etc. Examples of wearable devices are smart eyeglasses, a head-mounted-device (HMD), electronic clothing, an electronic bracelet, an electronic necklace, an electronic accessory, an electronic tattoo, a smart mirror, a smart watch, etc.

An electronic device according to an embodiment of the present disclosure may be smart home appliances. Smart home appliances may include at least one of a television (TV), a Digital Video Disk (DVD) player, an audio system, a refrigerator, an air-conditioner, a cleaning device, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, an electronic album, etc.

An electronic device according to an embodiment of the present disclosure may include at least one of various medical devices (e.g., various portable medical applications (e.g., a blood glucose monitor, a heart rate monitor, a blood pressure monitor, a temperature monitor, etc.), Magnetic Resonance Angiography (MRA), Magnetic Resonance Imaging (MRI), Computed Tomography (CT), a scanning machine, an ultrasonic wave device, etc.), a navigation device, a Global Positioning System (GPS) receiver, an Event Data Recorder (EDR), a Flight Data Recorder (FDR), a vehicle infotainment device, electronic equipment for ships (e.g., navigation equipment, gyrocompass, etc.), avionics, a security device, a head unit for a vehicle, an industrial or home robot, an automatic teller machine (ATM), a point of sale (POS) system, Internet of Things devices (e.g., lights, various sensors, electric or gas meter, a sprinkler system, street lights, a toaster, fitness equipment, a hot water tank, a heater, a boiler, etc.), and the like.

An electronic device according to an embodiment of the present disclosure may include one or more of furniture or a portion of a building/structure, an electronic board, an electronic signature receiving device, a projector, various measuring instruments (e.g., a water meter, an electric meter, a gas meter and a wave meter), etc. In an embodiment of the present disclosure, an electronic device may also include a combination of the components listed above. An electronic device according to an embodiment of the present disclosure may be a flexible device. It is obvious to those skilled in the art that the electronic device according to various embodiments of the present disclosure is not limited to the aforementioned devices and may also include new devices as new technologies are developed.

Hereinafter, electronic devices according to an embodiment of the present disclosure are described in detail with reference to the accompanying drawings. In the description, the term a 'user' is referred to as a person or a device that uses an electronic device, e.g., an artificial intelligence electronic device.

FIG. 1 is a block diagram illustrating a network environment 100 including an electronic device 101 in accordance with an embodiment of the present disclosure. Referring to FIG. 1, the electronic device 101 includes but is not limited to, a bus 110, a processor 120, a memory 130, an input/output interface 150, a display 160, and a communication interface 170. In particular embodiments, at least one of the elements of the electronic device 101 may be omitted or other elements may be additionally included in the electronic device 101.

The bus 110 may include a circuit which interconnects the elements 110 to 170 and enables communication (e.g., a control message and/or data) between the elements 110 to 170.

The processor 120 may include one or more of a Central Processing Unit (CPU), an Application Processor (AP), and a Communication Processor (CP). The processor 120 may carry out operations or data processing relating to control and/or communication of at least one other element of the electronic device 101.

The memory 130 may include a volatile memory and/or a non-volatile memory. The memory 130 may store instructions or data relevant to at least one other element of the electronic device 101. According to an embodiment of the present disclosure, the memory 130 may store software and/or a program 140. The program 140 includes a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing a step or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may perform mediation by which the API 145 or the application 147 communicates with the kernel 141 to transmit or receive data. In addition, the middleware 143 may process one or more task requests received from the application programs 147 according to task priorities. For example, the middleware 143 may assign a priority, which enables the use of system resources (e.g., the bus 110, the processor 120, the memory 130, etc.) of the electronic device 101, to at least one of the application programs 147. For example, the middleware 143 may perform scheduling or load balancing on the one or more task requests by processing the one or more task requests according to the priorities assigned thereto.

The API 145 is an interface for allowing the application 147 to control a function provided by the kernel 141 or the middleware 143 which may include at least one interface or function (e.g., a command) for file control, window control, image processing, text control, and the like.

The input/output interface 150 may function as an interface that transfers instructions or data input from a user or other external device to the other element(s) of the electronic device 101. Furthermore, the input/output interface 150 may output the instructions or data received from the other element(s) of the electronic device 101 to the user or other external devices.

The display 160 may include a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various content (e.g., text, images, videos, icons, symbols, etc.) to the user. The display 160 may include a touch screen, and receive a touch, gesture, proximity, or hovering input using an electronic pen or a body part of a user.

The communication interface 170 may control communication between the electronic device 101 and an external device (e.g., a first external electronic device 102, a second external electronic device 104, or a server 106). The communication interface 170 may be connected to a network 162 through wireless or wired communication to communicate with the second external electronic device 104 or the server 106.

The wireless communication may use at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include short range communication 164. The short-range communication 164 may include at least one of WiFi, Bluetooth, and Near Field Communication (NFC), and the electronic device may use the Global Positioning System (GPS). The wired communication may include at least one of a Universal Serial Bus (USB), a High Definition Multimedia Interface (HDMI), Recommended Standard 232 (RS-232), and a Plain Old Telephone Service (POTS). The network 162 may include at least one of communication networks, such as a computer network (e.g., a Local Area Network (LAN), or a Wide Area Network (WAN)), the Internet, and a telephone network.

Each of the first and second external electronic devices 102 and 104 may be a type identical to or different from the electronic device 101. According to an embodiment of the present disclosure the server 106 may include a group of one or more servers. All or some of the operations performed in the electronic device 101 may be performed in another electronic device or a plurality of electronic devices 102 and 104 or the server 106. When the electronic device 101 has to perform some functions or services automatically or in response to a request, the electronic device 101 may make a request to perform at least some functions relating to other devices such as the electronic device 102 or 104 or the server 106, instead of performing the functions or services by itself. The other electronic device 102 or 104 or the server 106 may carry out the requested functions or the additional functions and transfer the result to the electronic device 101. The electronic device 101 may process the received result as it is or additionally provide the requested functions or services. To achieve this result, cloud computing, distributed computing, or client-server computing technology may be used.

Figure 2:
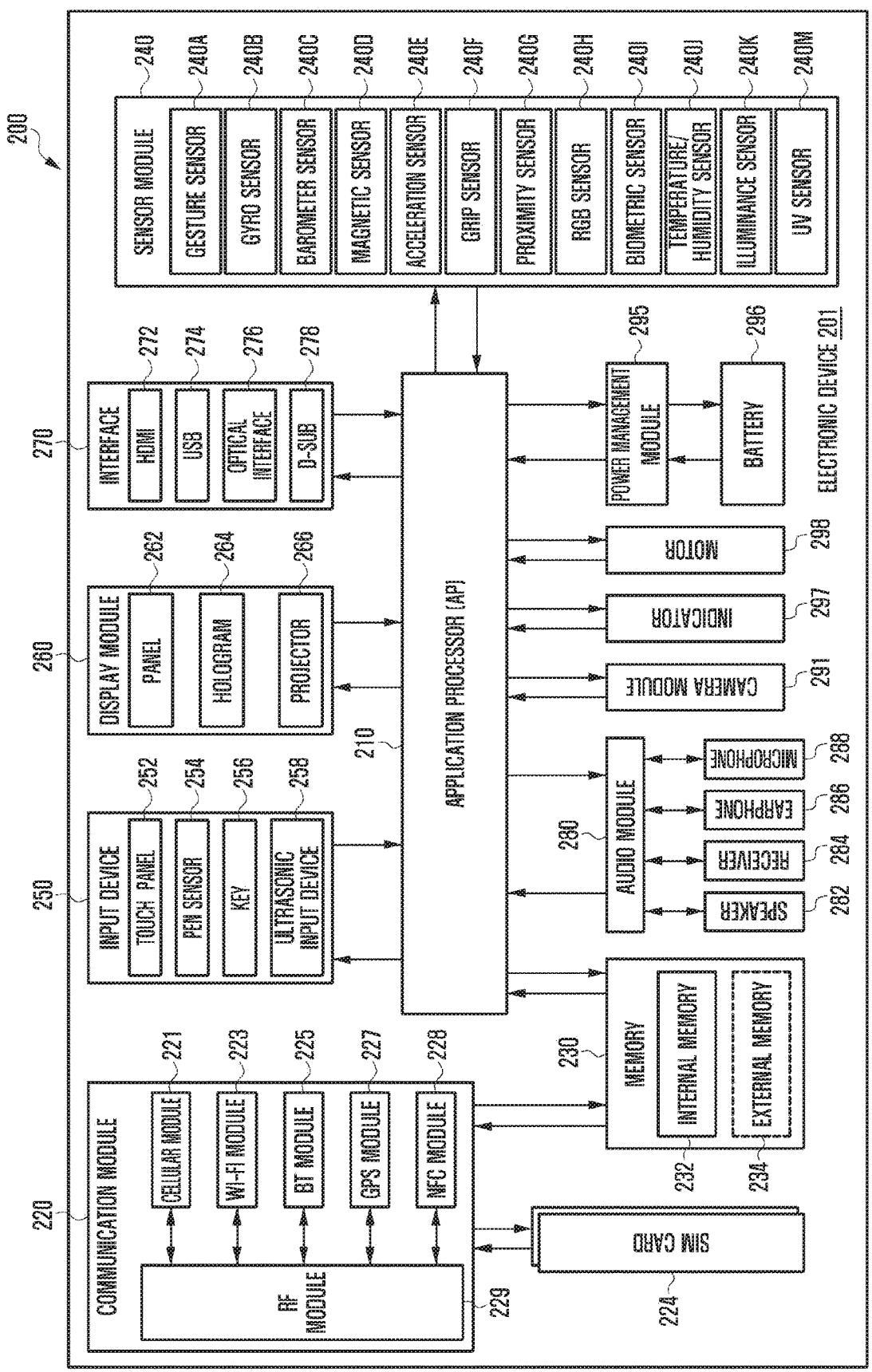
FIG. 2 illustrates a block diagram of an electronic device according to an embodiment of the present disclosure.

FIG. 2 is a block diagram illustrating an electronic device 201 in accordance with an embodiment of the present disclosure.

The electronic device 201 may form the whole or part of the electronic device 101 shown in FIG. 1. The electronic device 201 includes at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The processor 210 may execute an operating system or applications, control a plurality of hardware or software components connected thereto, and also perform processing and operations on various data including multimedia data. The Processor 210 may be produced as a system-on-chip (SoC), for example. The processor 210 may further include a graphic processing unit (GPU) and/or image signal processor. The processor 210 may include at least a portion of components shown in FIG. 2 (for example, cellular module 221). The processor 210 can process a command or data received from at least one other component (for example, non-volatile memory) by loading the command and/or data into the volatile memory, and store various data in the non-volatile memory.

The communication module 220 may have a configuration the same as or similar to the communication interface 170 of FIG. 1. The communication module 220 includes a cellular module 221, WiFi module 223, Bluetooth module 225, GPS module 227, NFC module 228, or RF (Radio Frequency) module 229.

The cellular module 221 can provide voice communication, video communication, text messaging, or Internet access service through a communication network. The cellular module 221 can perform identification and authentication of the electronic device 201 by using a subscriber identification module (SIM) 224 in the communication network. The cellular module 221 can perform at least a portion of functions provided by the processor 210. The cellular module 221 may include a CP (Communication Processor).

The WiFi module 223, Bluetooth module 225, GPS module 227, or NFC module 228 may individually include a processor for processing data transmitted and received through the corresponding module. At least one of the cellular module 221, WiFi module 223, Bluetooth module 225, GPS module 227, and NFC module 228 may be produced as an integrated circuit chip (IC) or IC package. The RF module 229 may transmit and receive data, e.g., RF signals or any other electrical signals. The RF module 229 may include a transceiver, a PAM (Power Amplifier Module), a frequency filter, an LNA (Low Noise Amplifier), antenna and the like. The WiFi module 223, the BT module 225, the GPS module 227 and the NFC module 228 share the RF module 229 and at least one of them may perform transmission and reception of RF signals through a separate RF module in an embodiment of the present disclosure.

The SIM 224 may be included in a card and/or embedded SIM, and may include specific identification information (for example, ICCID (Integrated Circuit Card Identifier)) or subscriber information (for example, IMSI (International Mobile Subscriber Identity)).

The memory 230 (for example, memory 130) may include an internal memory 232 or external memory 234. The internal memory 232 may include at least one of a volatile memory (for example, DRAM (Dynamic RAM), SRAM (Static RAM), or SDRAM (Synchronous Dynamic RAM)), and a non-volatile memory (for example, OTPROM (One Time Programmable ROM), PROM (Programmable ROM), EPROM (Erasable and Programmable ROM), EEPROM (Electrically Erasable and Programmable ROM), mask ROM, flash ROM, flash memory (for example, NAND flash or NOR flash), hard disk drive, or solid state drive (SSD).

The external memory 234 may include a flash drive, e.g., CF (Compact Flash), SD (Secure Digital), Micro-SD (Micro Secure Digital), Mini-SD (Mini Secure Digital), xD (eXtreme Digital), MMC (MultiMediaCard), memory stick, and the like. The external memory 234 may be functionally and/or physically connected to the electronic device 201 through various interfaces.

The sensor module 240 may measure physical quantities or sense the operating status of the electronic device 201, and then convert measured or sensed information into electric signals. The sensor module 240 includes at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. The electronic device 201 can control the sensor module 240, when the processor 210 is in a sleep state, by further including a processor configured to partially or separately control the sensor module 240.

The input unit 250 includes a touch panel 252, a digital pen sensor 254, a key 256, or an ultrasonic input unit 258. The touch panel 252 may recognize a touch input in a manner of capacitive type, resistive type, infrared type, or ultrasonic type. The touch panel 252 may further include a control circuit. The touch panel 252 may further include a tactile layer. In this case, the touch panel 252 may offer a tactile feedback to a user.

The pen sensor (digital pen sensor) 254 may be a portion of the touch panel or a separate identification layer. The key 256 may include a physical key, optical key, or keypad. The ultrasonic input device 258 detects ultrasonic waves generated by an input tool through a microphone 288, and identifies data corresponding to the detected ultrasonic waves.

The display 260 (e.g., the display 160) includes a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. The display 260 may further include a control circuit for controlling the panel 262, the hologram 264, and the projector 266.

The interface 270 includes an HDMI (High-Definition Multimedia Interface) 272, a USB (Universal Serial Bus) 274, an optical interface 276, or a D-sub (D-subminiature) 278. The interface 270 may be contained in the communication interface 170 shown in FIG. 1. Additionally or alternatively, the interface 270 may include an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained in the input/output interface 145 shown in FIG. 1. The audio module 280 may process sound information through a speaker 282, a receiver 284, an earphone 286, or the microphone 288.

The camera module 291 may capture a still image and a moving image. The camera module 291 may include one or more image sensors (e.g., a front lens or a back lens), an Image Signal Processor (ISP), and a flash LED.

The power management module 295 may manage power of the hardware 200. Although not illustrated, the power management module 295 may include a Power Management Integrated Circuit (PMIC), a charger Integrated Circuit (IC), or a battery gauge. The PMIC may be produced as an IC or an SoC semiconductor. Battery charging methods may include a wired charging method and a wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging. The battery gauge may measure a residual quantity of power in the battery 296, or a voltage, a current or a temperature during battery charging. The battery 296 may supply power by storing electricity, and may be a rechargeable battery or solar battery.

The indicator 297 may indicate particular states of the electronic device 201 or a part (e.g., the AP 210) of the electronic device 201, for example, a booting state, a message state, a charging state and the like. The motor 298 may convert an electrical signal into a mechanical vibration or generate vibration, or haptic effect. Although not illustrated, the electronic device 201 may include a processing unit (e.g., a GPU) for supporting mobile TV service. The processing unit for supporting a mobile TV service may process media data according to standards such as Digital Multimedia Broadcasting (DMB), Digital Video Broadcasting (DVB), MediaFlo, and the like.

Each of the above-described elements of the electronic device 201 according to an embodiment of the present disclosure may include one or more components, and the name of the relevant element may change depending on the type of electronic device. The electronic device 201 may include at least one of the above-described elements. Some of the above-described elements may be omitted from the electronic device 201, or the electronic device 201 may further include additional elements. Some of the elements of the electronic device 201 may be combined into one entity, which may perform functions identical to those of the relevant elements before the combination.

Figure 3:
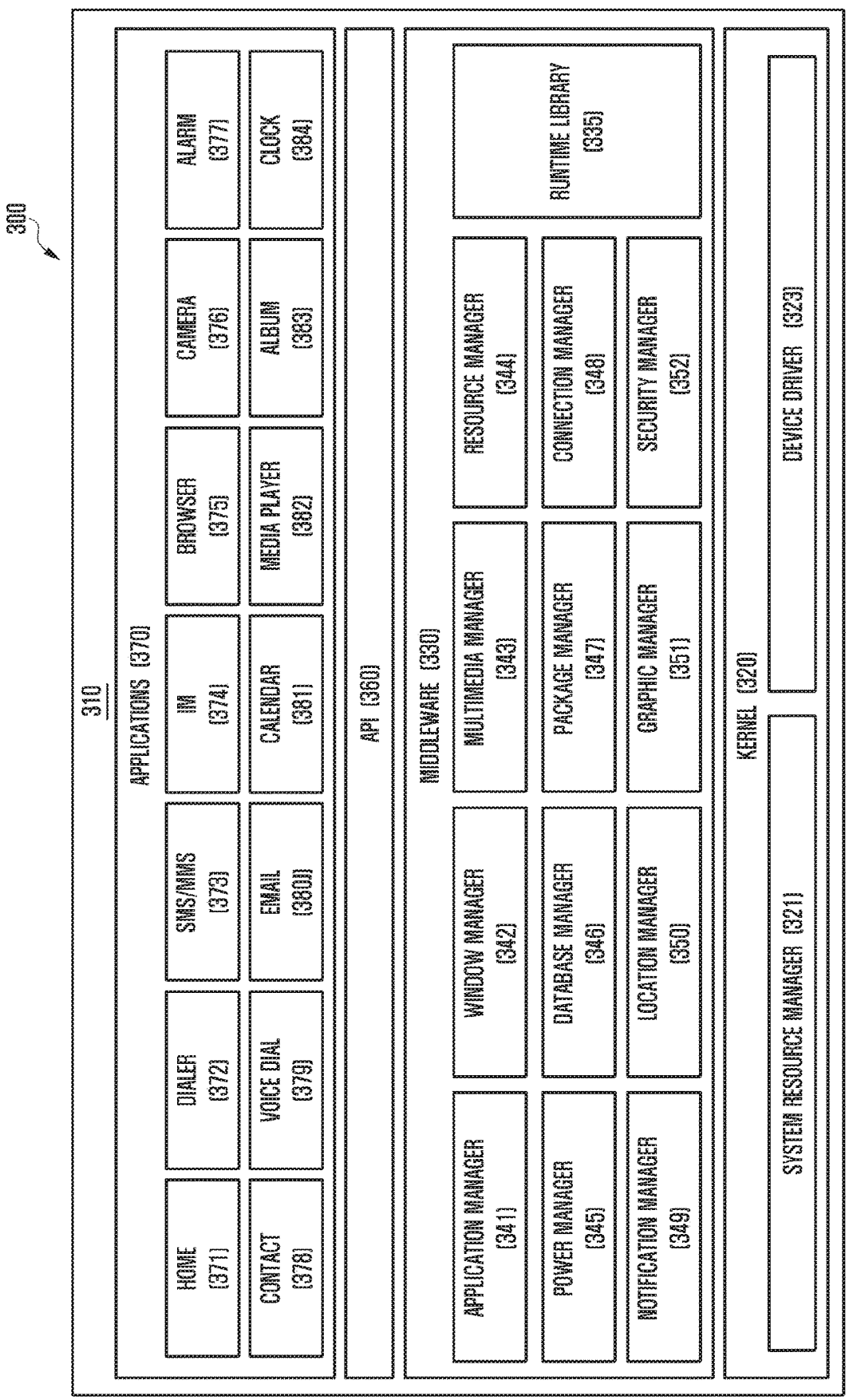
FIG. 3 illustrates a block diagram of a programming module according to an embodiment of the present disclosure.

FIG. 3 illustrates a block diagram 300 of a programming module 310 according to an embodiment of the present disclosure. The program module 310 (e.g., program 140 shown in FIG. 1) is capable of including an operating system (OS) for controlling resources related to the electronic device (e.g., electronic device 101 shown in FIG. 1) and/or various applications (e.g., application program 147 shown in FIG. 1) running on the OS. The OS may be Android, iOS, Windows, Symbian, Tizen, Bada, etc.

The program module 310 includes a kernel 320, middleware 330, application programming interface (API) 360 and/or application 370. At least part of the program module 310 may be preloaded on the electronic device or downloaded from a server (e.g., server 106).

The kernel 320 (e.g., kernel 141 shown in FIG. 1) includes a system resource manager 321 or a device driver 323. The system resource manager 321 is capable of performing control, allocation, reclamation, etc. of system resources. According to an embodiment of the present disclosure, the system resource manager 321 may include a processor manager, a memory manager, a file system manager, etc. The device driver 323 is capable of including various drivers for displays, cameras, Bluetooth, sharing memory, USB, keypad, Wi-Fi, audio, inter-process communication (IPC), etc.

The middleware 330 is capable of providing functions commonly required for the application 270, or providing various functions to the application 370 via the API 360 so that the application 370 can efficiently use system limited resources in the electronic device. The middleware 330 (e.g., middleware 143 shown in FIG. 1) includes at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 is capable of including a library module that a compiler uses to add a new function via a programming language while the application 370 is running. The run time library 335 is capable of performing input/output management, memory management, operations for arithmetic functions, etc.

The application manager 341 is capable of managing the life cycle of at least one of the applications in the application 370. The window manager 342 is capable of managing GUI resources used for the screen. The multimedia manager 343 is capable of detecting a format to play back various media files and encoding or decoding a media file by using a codec corresponding to the format. The resource manager 344 is capable of managing resources such as memory or storage space, source code for at least one of the applications in the application 370, etc.

The power manager 345 is capable of managing the battery or the electric power source, based on operating with the basic input/output system (BIOS) and providing electric power information required for the operation of the electronic device 101. The database manager 346 is capable of creating, searching for or altering a database to be used by at least one of the applications in the application 370. The package manager 347 is capable of managing the installation or update of applications distributed in the form of a package file.

The connectivity manager 348 is capable of managing the wireless connectivity, such as Wi-Fi, Bluetooth, etc. The notification manager 349 is capable of displaying or notifying the user of events such as a received message, a scheduled event, a proximity notification, etc., in a mode without disturbing the user. The location manager 350 is capable of managing the location information regarding the electronic device. The graphic manager 351 is capable of managing a graphic effect to be provided to the user or a user interface related to the graphic effect. The security manager 352 is capable of providing various security functions required for the system security, the user authentication, etc. When the electronic device 101 includes a phone function, the middleware 330 may further include a telephony manager for managing a voice or video call function in the electronic device.

The middleware 330 may include a middleware module for combining the various functions of the components described above. The middleware 330 may provide modules specialized to the type of operating system in order to provide distinctive functions. In addition, the middleware 330 may be adaptively configured to remove part of the components or to include new components.

The API 360 (e.g., API 145) is a set of API programming functions, for example, and may be provided in different configurations according to types of operating systems. For example, when the operating system is Android or iOS, each platform may be provided with one API set; when the step system is Tizen, each platform may be provided with two or more API sets.

The application 370 (e.g., application programs 147 shown in FIG. 1) includes one or more applications for providing functions home 371, dialer 372, SMS/MMS 373, instant message (IM) 374, browser 375, camera 376, alarm 377, contact 378, voice dialer 379, email 380, calendar 381, media player 382, album 383, clock 384, health care (e.g., measurement of the amount of exercise, blood sugar, etc.), environmental information (e.g., atmospheric pressure, humidity, temperature, etc.), and so on.

According to an embodiment of the present disclosure, the application 370 may include an application for supporting information exchange between the electronic device 101 and external electronic devices 102 and 104, which is called an 'information exchange application. The information exchange application may include a notification relay application for relaying specific information to the external electronic devices or a device manager application for managing the external electronic devices.

The notification relay application may include a function to relay notification information created by any other application of the electronic device (e.g., the SMS/MMS application, the email application, the health care application, or the environment information application, etc.) to external electronic devices 102 and 104. The notification relay application may also receive notification information from an external electronic device and provide it to the user. The device management application may manage (e.g., install, remove or update): at least one function of an external electronic device (e.g., electronic device 104) communicating with the electronic device (e.g., a power on/off of the external electronic device (or part of the components) or adjusting the brightness or resolution of the display); an application running the external electronic device; or a service (e.g., a call service or a message service) offered by the external electronic device.

According to an embodiment of the present disclosure, the application 370 may include an application specified according to attributes of an external electronic device 102 or 104. For example, when the external electronic device is a mobile electronic device and the attribute is a type of medical electronic device, the specified application may be a health care application. According to an embodiment of the present disclosure, the application 370 may include applications received from external electronic devices such as server 106 or electronic devices 102 and 104. The application 370 may include a preloaded application or a third party application downloaded from a server. It should be understood that the names of components in the program module 310 of the embodiments may vary according to the type of operating system.

According to an embodiment of the present disclosure, at least part of the programming module 310 may be implemented with software, firmware, hardware, or any combination thereof. In addition, at least part of the programming module 310 may be implemented with a processor (e.g., application processor 210 shown in FIG. 2). At least part of the programming module 310 may include modules, programs, routines, sets of instructions or processes, etc., in order to perform one or more functions.

In the present disclosure, the term 'module' refers to a 'unit' including hardware, software, firmware or a combination thereof. For example, the term 'module' is interchangeable with 'unit,' 'logic,' 'logical block,' 'component,' 'circuit,' and the like. A 'module' may be the smallest unit or a part of an integrated component. A 'module' may be the smallest unit or a part thereof that can perform one or more functions. A 'module' may be implemented in mechanical or electronic mode. For example, a 'module' may include at least one of the following: an application specific integrated circuit (ASIC) chip, field-programmable gate array (FPGAs) and a programmable-logic device that can perform functions that are known or will be developed.

At least part of the method (e.g., operations) or devices (e.g., modules or functions) according to an embodiment of the present disclosure may be implemented with instructions that can be executed via various types of computers and stored in computer-readable storage media, as types of programming modules. One or more processors can execute command instructions, thereby performing the functions. An example of the computer-readable storage media may be memory 130.

Examples of computer-readable media include magnetic media, such as hard disks, floppy disks, and magnetic media (e.g., magnetic tape); optical media such as Compact Disc Read Only Memory (CD-ROM) disks and Digital Versatile Disc (DVD); magneto-optical media, such as floptical disks; and hardware devices such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules to perform the operations of various embodiments described above, or vice versa.

Modules or programming modules according to an embodiment of the present disclosure may include one or more components as described above, or further include new components. The operations performed by modules, programming modules, or other components, according to an embodiment of the present disclosure, may be executed in serial, parallel, repetitive or heuristic fashion. Part of the operations can be executed in any other order, skipped, or executed with additional operations.

The embodiments of the present disclosure are merely provided to assist in a comprehensive understanding of the disclosure and are not limited. Therefore, it should be understood that many variations and modifications of the basic inventive concept herein described will still fall within the spirit and scope of the embodiments of the present disclosure as defined in the appended claims.

FIG. 4 is a diagram of segmentation of an image 400 in an electronic device according to an embodiment of the present disclosure. Referring to FIG. 4, an image 400 is divided into a plurality of blocks. Divided blocks may form a hierarchical structure, e.g., a tree structure.

According to an embodiment of the present disclosure, the image 400 may be divided into a plurality of primary blocks 401~456. The plurality of primary blocks 401~456 may have the same level in the hierarchical structure. Each of the plurality of primary blocks 401~456 may correspond to an item of image attribute information, e.g., depth or resolution. From among the plurality of primary blocks 401~456, at least part of the items of image attribute information (e.g., depth, resolution, etc.) may differ from the image attribute information corresponding to the image 400.

According to an embodiment of the present disclosure, a range or unit of at least one item (e.g., depth, resolution, etc.) included in the image attribute information may correspond to a level of the hierarchical structure. For example, when the plurality of primary blocks 401~456 have the same level, at least one item of image attribute information may correspond to the same range or unit.

From among the plurality of primary blocks 401~456, at least one primary block 423 may be divided into a plurality of secondary blocks 423-1~423-N. The secondary blocks 423-1~423-N may be sub-blocks or sub-segments of the primary block 423. Each of the plurality of secondary blocks 423-1~423-N may correspond to an item of image attribute information, e.g., depth or resolution. From among the plurality of secondary blocks 423-1~423-N, at least part of the image attribute information (e.g., depth, resolution, etc.) may differ from the image attribute information corresponding to the primary block 423.

According to an embodiment of the present disclosure, from among the plurality of secondary blocks 423-1~423-N, at least one secondary block may be divided into a plurality of tertiary blocks (not shown). The tertiary blocks may be sub-blocks or sub-segments of the secondary block.

According to an embodiment of the present disclosure, each of the plurality of blocks 401~456 and 423-1~423-N may further correspond to the identifying information, the photography information (e.g., a photographic view, a photographic composition, a photographic date, a photographic time, a photographic location, a temperature when taking a photograph, a photographic illuminance, camera setting conditions, the camera owner, etc.), the object information (e.g., person, mountain, sea, etc.) and so on. The respective blocks have unique identifying information, e.g., a letter, a number, a mark, or a combination thereof. For instance, the primary blocks 401~456 may have the identifying information items [1, 0, 0], [2, 0, 0], . . . , and [56, 0, 0], respectively. For example, when a primary block 423 has the identifying number, [23, 0, 0], the corresponding secondary blocks 423-1~423-N have the identifying information items [23, 1, 0], [23, 2, 0], . . . , and [23, N, 0], respectively. The blocks may have the same photography information as the image 400. When the image 400 is created by combining or compounding a plurality of images including a first image and/or a second image, the photography information about part of the blocks may be identical to that of the first image and the photography information about the other part of the blocks may be identical to that of the second image. In addition, the photography information about part of the blocks may be implemented in such a way that it can be created by combining or compounding a plurality of images with each other. For example, the photographic time of the photography information may be a time when a plurality of images are combined or compounded with each other. The camera owner of the photography information may be a user of the device where a plurality of images are combined or compounded with each other.

According to an embodiment of the present disclosure, dividing an image into a plurality of blocks, e.g., primary blocks, secondary blocks, . . . , N-th blocks, may be performed based on the size of block. The primary blocks may have the same size as each other; the secondary blocks may have the same size as each other; and the N-th blocks may have the same size as each other. For example, the size of the primary blocks may be greater than the secondary blocks. The size of the secondary blocks may be greater than the tertiary blocks. The size of the N−1-th blocks may be greater than the N-th blocks.

According to an embodiment of the present disclosure, the size of each of the plurality of blocks may be determined based on the distance of an object (e.g., a subject) included in an image from the camera. The distance corresponding to an object in an image may be obtained by an image sensor (e.g., the camera module 391) that photographed the image, or another distance measuring sensor (e.g., RGB sensor 240H, IR sensor 240M or radar). For an object relatively far from the camera, the image attribute (e.g., resolution) related to the object corresponding to the relatively far distance (e.g., distance on the order of meters) may be set to be relatively low. The image attribute (e.g., resolution) related to an object corresponding to a relatively close distance (e.g., distance on the order of centimeters or millimeters) may be set to be relatively high. In this case, the image can be expressed with a high level of distance sensitivity. For example, each of the blocks of an image may be determined in size according to distances corresponding to objects, so that the image attribute related to the objects can be set to various levels.

According to an embodiment of the present disclosure, an electronic device with a camera module for taking images is capable of emitting light, ultrasonic waves, or electromagnetic waves to measure distance; sensing the waves (e.g., reflected light, reflected ultrasonic waves or reflected electromagnetic waves) reflected from an object to be included in an image; and measuring the distance to the object from the electronic device, by using a distance measuring sensor (e.g., RGB sensor 240H, IR sensor 240M, ultrasonic sensor or radar) operatively coupled to the electronic device. In addition, the electronic device may also evaluate the direction of an object (from the electronic device as the origin) by using the sensed reflected waves. According to another embodiment of the present disclosure, the electronic device may take images of an object by using two or more lenses; evaluate disparities corresponding to the object from the images taken by the lenses; and measure the distance between the object and the electronic device from the disparities.

According to an embodiment of the present disclosure, an electronic device that photographed the images is capable of measuring distances corresponding to respective objects in the image; determining a representative range of distance based on the distance distribution including the measured distance values related to the image; and determining the image attribute corresponding to each of the degree of blocks, based on the determined range of distance. For example, when a representative range of distance is 3 to 4 meters, the electronic device may determine the distance unit for primary blocks as 80 centimeters or 1 meter; the distance unit for secondary blocks as 1 or 10 centimeters; and the distance unit for tertiary blocks as 1 or 10 millimeters.

According to an embodiment of the present disclosure, the size of each of the plurality of blocks may be determined based on the measurement performance (or distance measurement resolution) of a distance measuring sensor (e.g., RGB sensor 240H, IR sensor 240M, or radar). For example, since the distance measuring sensor has a limitation when measuring distances for all the points in an image, it may be implemented in such a way as to divide an image into a plurality of areas and to measure distances to points corresponding to the divided areas. A plurality of blocks configuring the image may be formed to correspond to the areas divided by the distance measuring sensor, respectively. For instance, when the image sensor has a photographic resolution of 1920×960 and the distance measuring sensor has a resolution of 640×480 to measure a distance, the distance measuring sensor is capable of measuring distances to 640×480 points. Therefore, the size of each of the blocks may be set to include 3×2 pixels as the unit pixel.

It should be understood that determining the size of each of a plurality of blocks or dividing an image or block into a plurality of blocks or sub-blocks may also be performed by various methods modified from the embodiments described above. The segmentation system of the image described in the present disclosure is not limited to the embodiments described above and may also include future segmentation technology as technology develops, as well as conventional technology.

Figure 5A:
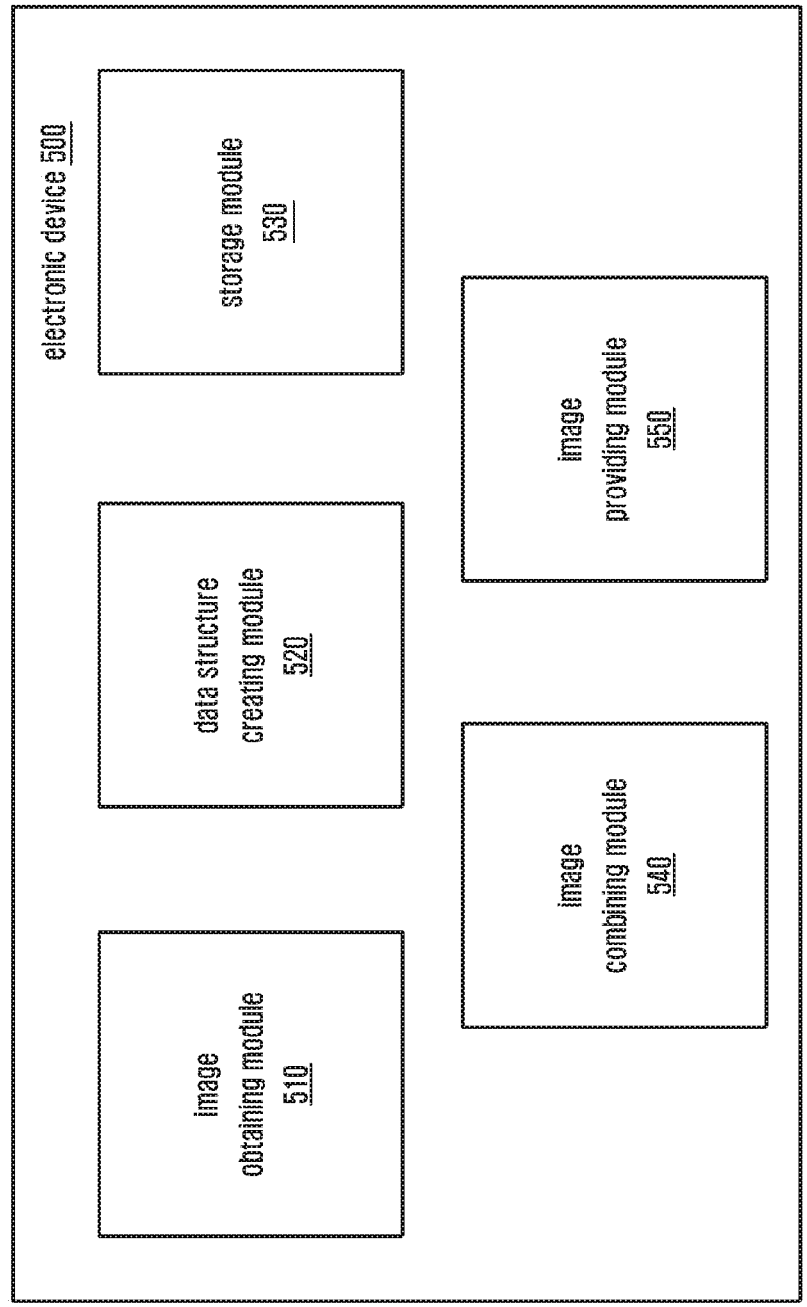
FIGS. 5A and 5B are block diagrams of electronic devices according to an embodiment of the present disclosure.
Figure 5B:
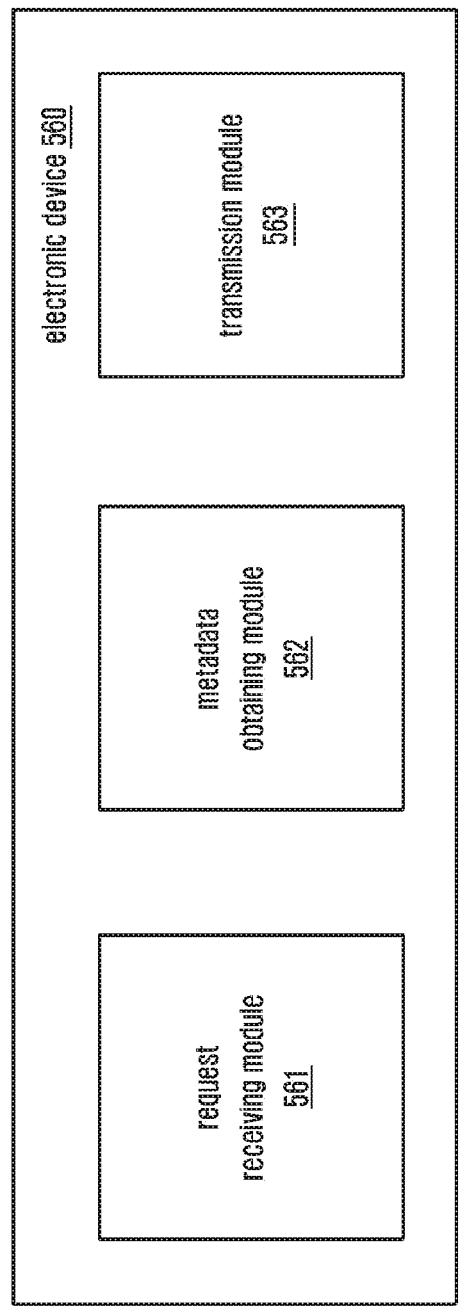

FIGS. 5A and 5B are schematic block diagrams of electronic devices according to various embodiments. Referring to FIG. 5A, the electronic device 500 include, for example, an image obtaining module 510, a data structure creating module 520 and a storage module 530.

The image obtaining module 510 is capable of obtaining images 400. According to an embodiment of the present disclosure, the image obtaining module 510 is capable of obtaining images sensed (photographed/taken) by an image sensor (e.g., camera module 291) operatively coupled to the electronic device. The image obtaining module 510 is capable of obtaining images from the outside via a communication module 220 operatively coupled to the electronic device 101.

The data structure creating module 520 is capable of creating a data structure to store information related to images (e.g., metadata). According to an embodiment of the present disclosure, the data structure creating module 520 is capable of creating a hierarchical data structure (e.g., tree structure) including a plurality of layers such as at least a first layer and a second layer. When an image may be divided into a plurality of blocks and at least part of the information items related to the image may also be distinguished from each other according to corresponding divided blocks, the data structure creating module 520 may be implemented in such a way as to create the hierarchical data structure, thereby enabling efficient storing and searching for information items corresponding to respective blocks.

According to an embodiment of the present disclosure, the data structure creating module 520 is capable of forming the hierarchical data structure so that the first metadata corresponding to an image obtained by the image obtaining module 510 is associated with the first layer of the hierarchical data structure. When an image obtained by the image obtaining module 510 is divided into a plurality of blocks, the data structure creating module 520 may form a hierarchical data structure so that the second metadata that corresponds to one or more of the divided blocks respectively is associated with the second layer of the hierarchical data structure. The first layer may be above the second layer in the hierarchical data structure. For example, the first layer and second layer may be implemented to correspond to a first level and a second level respectively, where the second level is below the first level.

The storage module 530 is capable of storing a data structure for information (e.g., metadata) related to the image created by the data structure creating module 520 in a storage unit (e.g., memory 230) operatively coupled to the electronic device 500, associated with the image obtained by the image obtaining module 510. The storage unit is not limited to the memory 230 inside the electronic device 500 and may be other external devices (e.g., electronic device 104 or server 106) outside the electronic device 500. According to an embodiment, the other external devices may make an upload or compound for software (e.g., program module 310), data, content (e.g., images), etc., stored in the memory inside the electronic device 500, automatically, periodically or selectively, and may provide a service (e.g., cloud service) for providing the uploaded or compounded software, data, content, etc. to the electronic device 500.

According to an embodiment of the present disclosure, the storage module 530 is capable of storing a hierarchical data structure so that the hierarchical data structure for information related to an image is included in or linked to a part of the image. The storage module 530 may store a hierarchical data structure or a link indicating a location where the hierarchical data structure is stored, in the header of the image or a specified portion between the body and the header of the image.

According to an embodiment of the present disclosure, the electronic device 500 includes an image combining module 540 and/or an image providing module 550. The image combining module 540 is capable of creating at least one third image by combining a plurality of images obtained by the image obtaining module 510 first and second images. The image combining module 540 may create information related to a third image (e.g., metadata of a third image) that will be stored, related to the third image, based on information (e.g., metadata of a first image and metadata of a second image) stored in a storage unit (e.g., memory 230) operatively coupled to the electronic device 500, related to the first and second images. The image combining module 540 may also create information that will be stored, related to a third image, based on additional information related to at least one of the following: first, second and third images.

According to an embodiment of the present disclosure, the image combining module 540 is capable of storing information related to a third image, associated with the third image, in a storage unit such as memory 230, operatively coupled to the electronic device 500, via the storage module 530. The image combining module 540 may store information related to the third image, as at least part of the hierarchical structure formed in association with the third image.

The image providing module 550 is capable of providing images that are obtained by the image obtaining module 510, stored by the storage module 530, or created by the image combining module 540, to a user of the electronic device 500 or other devices 102 or 104 or server 106 outside the electronic device 500. According to an embodiment of the present disclosure, the image providing module 550 is capable of transmitting images or information (e.g., metadata) related to the images to the other devices via a communication module 220 operatively coupled to the electronic device 500. The image providing module 550 is capable of displaying images or information (e.g., metadata) related to the images on a display 260 operatively coupled to the electronic device 500. The image providing module 550 is also capable of extracting audio (e.g., sounds recorded during the recording of images or added during the creating of images) from information related to the images or from converting information related to images into audio and to provide it to an audio module 280 operatively coupled to the electronic device. The image providing module 550 may output image-related information in the stored form or convert image-related information into any other form of information that differs from the stored form, by various output modules or devices operatively coupled to the electronic device.

Referring to FIG. 5B, the electronic device 560 (e.g., electronic device 101 or server 106) is capable of including a request receiving module 561, a metadata obtaining module 562 and a transmission module 563.

The request receiving module 561 is capable of receiving a request for images from other devices 102 or 104 outside the electronic device 560, via a communication module 220.

The metadata obtaining module 562 is capable of obtaining a hierarchical data structure formed as metadata corresponding to images associated with a plurality of layers. According to an embodiment of the present disclosure, the hierarchical data structure of metadata may include a plurality of layers containing at least a first layer and a second layer. First metadata corresponding to an image may be related to a first layer; and second metadata that respectively corresponds to one or more of a plurality of first blocks to which an image is divided into may be related to a second layer. The plurality of layers may further include a third layer. The hierarchical data structure may be formed in such a way that, when at least one of the blocks is divided into a plurality of sub-blocks, third metadata that respectively correspond to one or more sub-blocks may be related to a third layer.

The transmission module 563 is capable of transmitting (e.g., replying), to the other device that transmitted a request for an image, metadata related to at least one layer corresponding to the other device from among a plurality of layers forming the hierarchical data structure, as at least part of the response to the request, based on information related to other device, via a communication module 220. The information related to the other device may include at least one of the following: the display resolution of the other device and the capability related to the image processing of the other device.

According to an embodiment of the present disclosure, the other device may be a plurality of devices that have the same or different capability, resolution, etc. The other device may include a first external device corresponding to a first capability and a second external device corresponding to a second capability which is larger than the first capability. In that case, the transmission module 563 is capable of transmitting the first metadata to the first external device and the first and second metadata to the second external device. The other device may include a first external device corresponding to a first resolution and a second external device corresponding to a second resolution which is larger than the first resolution. In that case, the transmission module 563 is capable of transmitting the first metadata to the first external device and the first and second metadata to the second external device.

Figure 6:
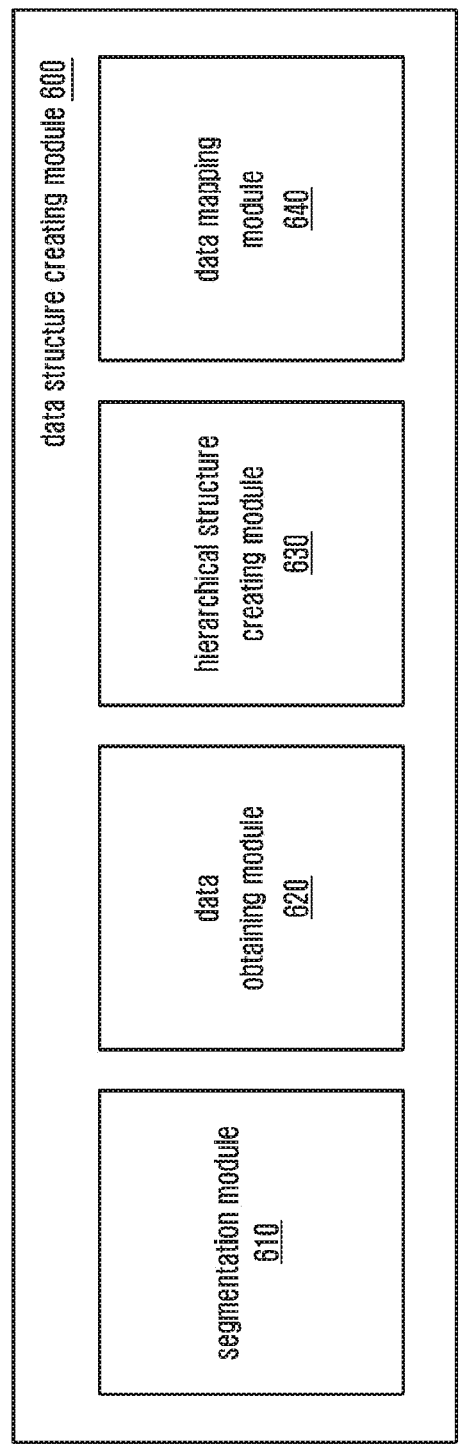
FIG. 6 is a block diagram of a data structure creating module of an electronic device according to an embodiment of the present disclosure.

FIG. 6 is a block diagram of a data structure creating module 600 of an electronic device according to an embodiment of the present disclosure. Referring to FIG. 6, the data structure creating module 600 includes a segmentation module 610, a data obtaining module 620, a hierarchical structure creating module 630, and a data mapping module 640.

The segmentation module 610 is capable of dividing an image into a plurality of blocks. According to an embodiment of the present disclosure, the segmentation module 610 is capable of dividing an image into multiple levels so that the divided blocks can form a hierarchical structure. For example, the divided blocks may include primary blocks (e.g., primary blocks 401~456) corresponding to a first level, secondary blocks (e.g., secondary blocks 423-1~423-N) corresponding to a second level, tertiary blocks corresponding to a third level and N-th blocks corresponding to an N-th level. The divided blocks may correspond to image attribute information items (e.g., depth or resolution) that differ from each other, according to the degree of division.

The data obtaining module 620 is capable of obtaining information related to images, e.g., metadata. According to an embodiment of the present disclosure, during the process of obtaining an image, the data obtaining module 620 may obtain information related to the image, or metadata, from an internal module that creates or provides the image (e.g., camera module 291, image obtaining module 510 or image combining module 540) or an external device 102 or 104 or a server 106. The data obtaining module 620 may obtain image-related information from images by image processing or may extract metadata (e.g., EXIF, IPTC, XMP, JFIF, JFXX, ICC profiles, etc.) from image files (e.g., JPEG, TIFF, PNG, BMP or GIF, etc.) obtained by an internal module or an external device.

The hierarchical structure creating module 630 is capable of creating a hierarchical data structure to configure image-related information. According to an embodiment of the present disclosure, the hierarchical data structure may include a plurality of layers containing at least a first layer and a second layer. The plurality of layers may correspond to levels that differ from each other. A first layer may correspond to a first level (e.g., the highest level, a root level, etc.) and a second layer may correspond to a second level lower than the first level.

The data mapping module 640 is capable of relating first metadata corresponding to an image to the first layer of the hierarchical data structure created by the hierarchical structure creating module 630. According to an embodiment of the present disclosure, the data mapping module 640 is capable of mapping the first metadata to the first or second data area, so that the first metadata is stored in the first data area corresponding to the first layer of the storage unit 230 or in the second data area that data stored in the first data area is linked to, by the storage module 530). The first metadata may include at least one of the following: an image resolution, depth, photography conditions (e.g., a photographic view, a photographic composition, a photographic date, a photographic time, a photographic location, a temperature when taking a photograph, a photographic illuminance, camera settings, etc.), subject information, etc. To form relationships between one or more blocks of a plurality of blocks divided within an image and second metadata, respectively, the first metadata may also include at least one of the following: information regarding a plurality of layers included in a corresponding hierarchical data structure, segmentation information regarding a plurality of blocks divided within the image, and identifying information indicating one or more blocks corresponding to the second metadata.

The data mapping module 640 is capable of relating the second metadata, which respectively corresponds to one or more blocks of a plurality of blocks divided within an image, to the second layer of the hierarchical data structure created in the hierarchical structure creating module 630. According to an embodiment of the present disclosure, the data mapping module 640 is capable of mapping the second metadata to the third or fourth data area, so that the second metadata is stored in the third data area corresponding to the second layer of the storage unit 230 or in the fourth data area stored in the third data area linked to the storage module 530.

Although the embodiment described above is implemented in such a way that the data structure creating module 600 includes a segmentation module 610, a data obtaining module 620, a hierarchical structure creating module 630, and a data mapping module 640, it should be understood that embodiments, of the present disclosure are not limited to the configuration of the data communication creating module 600. The data communication creating module 600 may be implemented in such a way as to include at least one of the segmentation module 610, data obtaining module 620, hierarchical structure creating module 630, and data mapping module 640. The data communication creating module 600 may further include modules for performing various functions in addition to the modules 610, 620, 630, and 640.

An electronic device according to an embodiment of the present disclosure includes a module for obtaining an image; a data structure creating module for creating a hierarchical data structure that includes a plurality of layers including at least a first layer and a second layer, so that first metadata corresponding to the image is associated with the first layer and second metadata, which corresponds to one or more of a plurality of blocks into which the image is divided, is associated with the second layer; and a storage module for storing the hierarchical data structure in association with the image in a storage unit operatively coupled to the electronic device.

According to an embodiment of the present disclosure, the second layer may be formed to be lower than the first layer in the hierarchical data structure.

According to an embodiment of the present disclosure, the storage module may be set in such a way as to store the first metadata in a first data area of the storage unit which corresponds to the first layer or in a second data area to which data stored in the first data area is linked.

According to an embodiment of the present disclosure, the storage module may be set in such a way as to store the second metadata in a third or fourth data area of the storage unit which corresponds to the second layer.

According to an embodiment of the present disclosure, the storage module may be set in such a way as to store the image so that the hierarchical data structure is included in or linked to a part of the image.

According to an embodiment of the present disclosure, part of the image may include the header of the image and/or a specified portion between the header and the body of the image.

According to an embodiment of the present disclosure, the electronic device may be set in such a way as to provide an external device with the hierarchical data structure, as at least part of the image or at least part of other data associated with the image.

According to an embodiment of the present disclosure, the electronic device may be set in such a way as to obtain additional information associated with the image; create third metadata based on the additional information and at least one of the second metadata or the first metadata; and associate the third metadata with the first layer, the second layer or a third layer of the hierarchical data structure.

According to an embodiment of the present disclosure, the first metadata may include at least one of information regarding the plurality of layers, segmentation information regarding the plurality of blocks, and identification information identifying one or more of the blocks.

According to an embodiment of the present disclosure, the first metadata may include at least one of a resolution, a depth, photography conditions and subject information, related to the image. The second metadata comprises at least one of the following: a resolution, a depth, photography conditions and subject information, related to one or more of the blocks.

According to an embodiment of the present disclosure, the data structure creating module is capable of creating the hierarchical data structure so that third metadata, which corresponds to one or more of a plurality of sub-blocks into which at least one of the blocks is divided, is associated with a third layer of the hierarchical data structure.

According to an embodiment of the present disclosure, the second metadata may include at least one of segmentation information regarding the plurality of sub-blocks and identification information indicating one or more sub-blocks.

An electronic device according to an embodiment of the present disclosure includes an image combining module for creating, based on at least a first image and a second image, a third image including at least part of the first image and at least part of the second image; and for creating metadata of the third image, based on metadata of the first image and metadata of the second image; and a storage module for storing the metadata of the third image in association with the third image in a storage unit operatively coupled to an electronic device. The metadata of the first image includes first metadata corresponding to one or more of a plurality of primary blocks into which the first image is divided. The metadata of the third image includes second metadata corresponding to one or more of a plurality of secondary blocks into which the third image is divided.

According to an embodiment of the present disclosure, the metadata of the second image may include third metadata corresponding to one or more of a plurality of tertiary blocks into which the second image is divided.

According to an embodiment of the present disclosure, the image combining module may create the second metadata, based on at least part of the first metadata and at least part of the third metadata.

According to an embodiment of the present disclosure, at least one of a photographic view, a photographic composition, a photographic date, a photographic time, a photographic location, a temperature when taking a photograph, a photographic illuminance, and camera settings, related to the first image may differ from at least one of a photographic view, a photographic composition, a photographic date, a photographic time, a photographic location, a temperature when taking a photograph, a photographic illuminance, and camera settings, related to the second image. The first and second images may differ from each other in terms of at least one of a photographic view, a photographic composition, a photographic date, a photographic time, a photographic location, a temperature when taking a photograph, a photographic illuminance, and camera settings.

An electronic device according to an embodiment of the present disclosure is capable of including a module for receiving a message requesting an image (called an image request) from an external device; a metadata obtaining module for obtaining a hierarchical data structure that includes a plurality of layers including at least a first layer and a second layer, wherein the hierarchical data structure is created so that first metadata corresponding to the image is associated with the first layer and second metadata, which corresponds to one or more of a plurality of primary blocks into which the image is divided, is associated with the second layer; and a module for transmitting to the external device, metadata associated with at least one layer corresponding to the external device from among the plurality of layers, as at least part of a reply in response to the request, based on the information related to the external device.

According to an embodiment of the present disclosure, the plurality of layers may further include a third layer. The hierarchical data structure may be formed in such a way that third metadata, which corresponds to one or more of a plurality of sub-blocks into which one of the blocks is divided, is associated with the third layer.

According to an embodiment of the present disclosure, the information related to the external device may include at least one of the capability related to the image processing function of the external device, and the display resolution of the external device.

According to an embodiment of the present disclosure, the external device is capable of including a first external device corresponding to a first capability, and a second external device corresponding to a second capability which is higher than the first capability. The transmission module may be set in such a way as to transmit the first metadata to the first external device, and to transmit the first metadata and the second metadata to the second external device.

According to an embodiment of the present disclosure, the external device is capable of including a first external device corresponding to a first display resolution, and a second external device corresponding to a second display resolution which is higher than the first display resolution. The transmission module may be set in such a way as to transmit the first metadata to the first external device, and to transmit the first metadata and the second metadata to the second external device.

Figure 7:
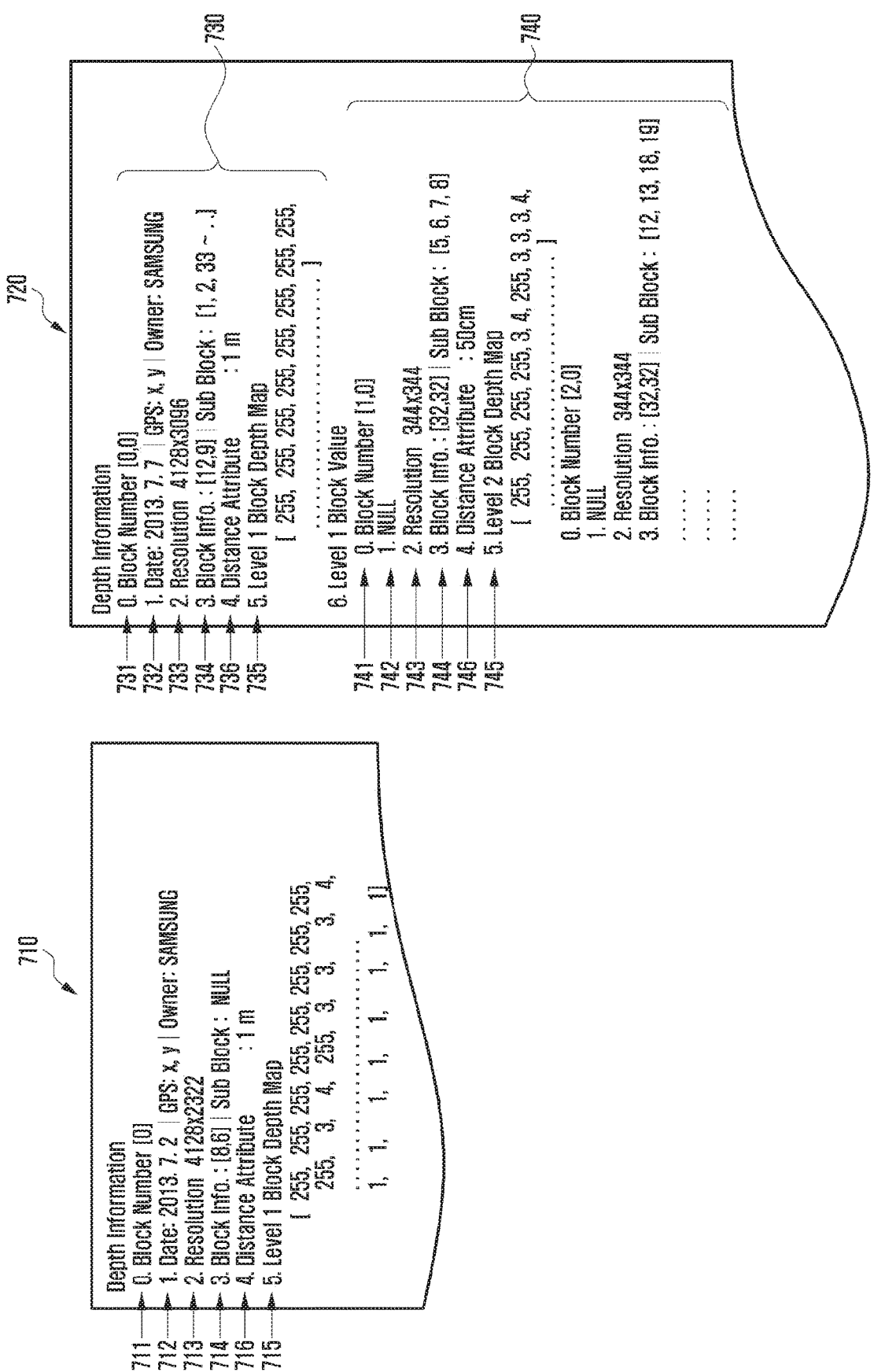
FIG. 7 is a diagram showing metadata of an image according to an embodiment of the present disclosure.

FIG. 7 shows diagrams containing metadata of an image according to an embodiment of the present disclosure. Referring to FIG. 7, metadata 710 of a first image and metadata 720 of a second image includes information to represent the depth of the image.

According to an embodiment of the present disclosure, the first image (e.g., "image1.jpg") may be divided into a plurality of primary blocks (e.g., approximately 48). Metadata 710 of the first image may include information 711 regarding the degree (level) of division of the first image, photography conditions 712 (e.g., date, time, GPS, composition or view, temperature, illuminance, owner, etc.), resolution 713, segmentation information 714 of the primary blocks (e.g., information identifying primary blocks divided into secondary blocks from among the primary blocks, segmentation form, etc.), and depth map 715 of the primary blocks. The depth map 715 of the primary blocks may be formed by mapping the depth values corresponding to the respective primary blocks to a matrix corresponding to the divided structures of the primary blocks. The depth values may be represented in the form of an integer with a range of 0~255, for example. Metadata 710 of the first image includes information regarding the unit of depth value for the depth map 715 of the primary blocks, as the depth unit information 716 of the primary blocks. Metadata 710 of the first image may further include information regarding other attributes related to the primary blocks, e.g., information regarding an edge map or ray tracing.

According to an embodiment of the present disclosure, when the electronic device takes a first image via the distance measuring sensor that has the distance measurement unit of 0.8 to 1 meters and the representative distance range of the first image is 3 to 4 meters, the electronic device is capable of dividing the first image into 8×6 blocks (refer to reference number 713) to create 48 primary blocks and determines the distance unit corresponding to the primary block to be 1 meter. The distance unit corresponding to the primary block may also be set to the depth unit information 716 of the primary blocks. For example, the depth map 715 of the primary block may be formed as depth values in a range of 0~255 with the unit of 1 meter. In this case, a block where any object (subject) is not located may be set to the depth value of 255 representing infinity and the other blocks may be set to depth values in the unit of 1 meter between an object (subject) and the electronic device. For example, when the first image has the representative distance range of 3 to 4 meters, most blocks of the first image may set the depth value to 3, 4 or 255. When the primary blocks divided into the secondary blocks do not exist, part of the segmentation information 714 of the primary blocks may be set to "NULL."

According to an embodiment of the present disclosure, the second image (e.g., "image2.jpg") may be divided into a plurality of primary blocks (e.g., approximately 108). Part of the primary blocks (e.g., $1^{st}$, $2^{nd}$, and $33^{rd}$ primary sub-blocks) each may be divided into 1024 secondary blocks in the form of 32×32. Metadata 720 of the second image may include the first metadata 730 and the second metadata 740.

The first metadata 730 includes at least part of the data that is the same type as the metadata of the first image. The first metadata 730 includes information 731 regarding the degree (or level) of division of the second image, photography conditions 732 (e.g., date, time, GPS, composition or view, temperature, illuminance, owner, etc.), resolution 733, segmentation information 734 of the primary blocks (e.g., information identifying primary blocks divided into a plurality of secondary blocks from among the primary blocks, segmentation form, etc.), depth map 735 of the primary blocks, and the depth unit information 736 of the primary blocks. The first metadata 730 may further include information regarding other attributes related to the primary blocks, e.g., information regarding an edge map or ray tracing.

According to an embodiment of the present disclosure, the second metadata 740 includes information 741 identifying the primary block divided into a plurality of secondary blocks, photography conditions 742, resolution 743, segmentation information 744 (e.g., information identifying secondary blocks divided into a plurality of tertiary blocks from among the secondary blocks, segmentation form, etc.), depth map 745 of the secondary blocks, and the depth unit information 746 of the secondary blocks. The second metadata 740 may further include information regarding other attributes related to the secondary blocks, e.g., information regarding an edge map or ray tracing.

According to an embodiment of the present disclosure, information regarding the degree (or level) of division of an image (e.g., reference numbers 711 and 731) and identifying information of individual blocks (e.g., reference number 741) may be in the same data format. The information regarding the number (or level) of division of an image refers to information regarding the whole image. For example, when the degree of division is one, it may be expressed as "[0]" (refer to reference number 711). When the degree of division is two, it may be expressed as "[0]" (refer to reference number 731). As such, information regarding the degree (or level) of image division may be expressed as at least one (e.g., "0") of a letter, number and mark which do not refer to a particular block, and each of the letter, number and mark may repeatedly be arranged by the degree or level of division. This expression or arrangement may express the degree or level of division of image and may also show that the information regarding the degree or level of division of the image is the information regarding the whole image, not limited to a particular block of the image, while forming the information regarding the degree or level of division of the image (e.g., reference numbers 711 and 731) in the same or similar format as the identifying information of individual blocks (e.g., reference number 741).

Referring to metadata 710 of the first image, the first image may have the primary order (reference number 711) as the degree of division and 1 meter as the depth unit of the primary blocks (reference number 716). Referring to metadata 720 of the second image, the second image may have the secondary order (reference number 731) as the degree of division and 1 meter as the depth unit of the primary blocks (reference number 736) and 50 centimeter as the depth unit of the secondary blocks (reference number 746). This may show that the camera module that took the second image has a higher measurement accuracy in terms of resolution than the camera module that took the first image.

Figure 8:
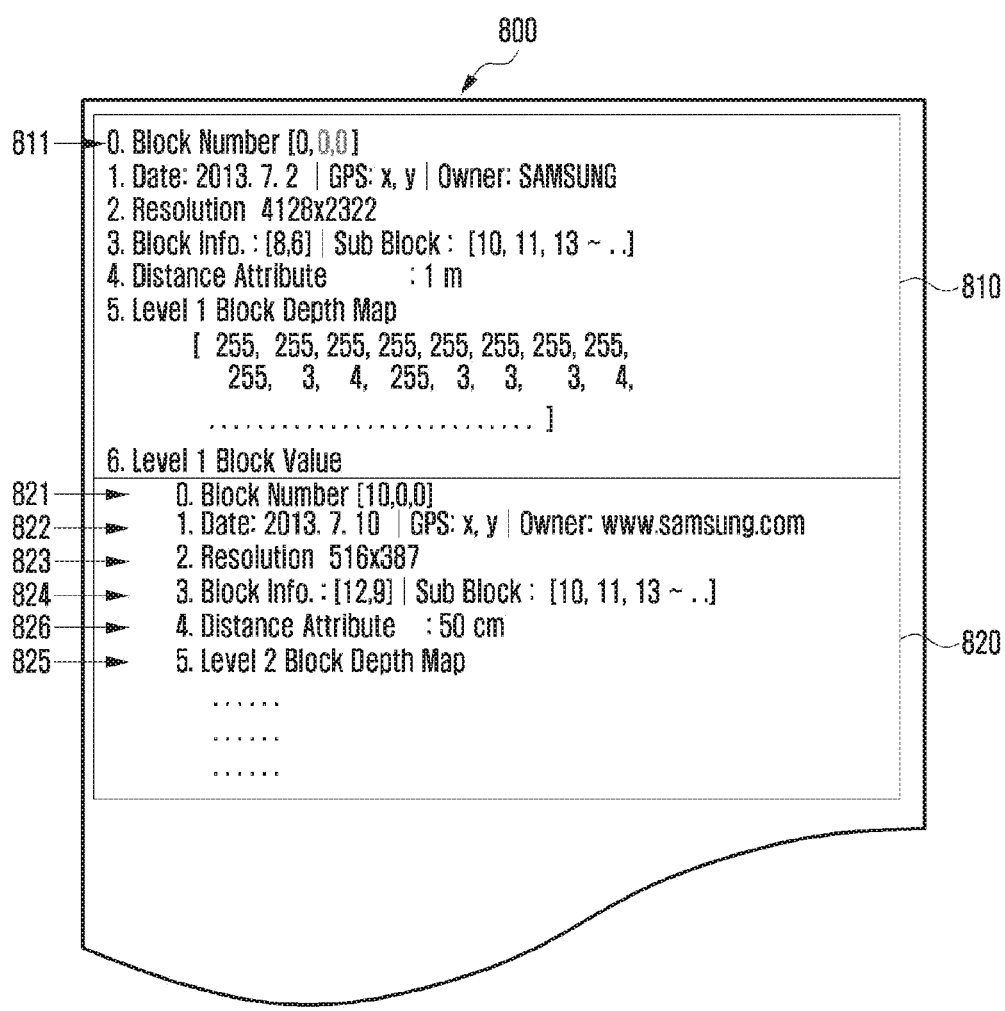
FIG. 8 is a diagram of metadata altered as the degree of image division increases according to an embodiment of the present disclosure.

FIG. 8 is a diagram of metadata altering as the degree of image division increases according to an embodiment of the present disclosure.

According to an embodiment of the present disclosure, a particular image (e.g., image1.jpg) may increase in resolution accuracy, as an index related to image display performance, through image processing, by an electronic device operatively coupled to a camera module that took the image or other device (e.g., server 106) communicatively coupled to the electronic device. For example, a server 106 having a higher computing capability than a camera module or an electronic device may increase an image in resolution or accuracy by comparing the image with the other image that other camera module or electronic device took of the same object or subject or at the same location as the image. Additionally or alternatively, as a super resolution algorithm is applied to a corresponding image, the image may increase in resolution or accuracy. When the image increases in resolution or accuracy, the degree of image division may be raised or the depth unit of a corresponding block may be set or altered.

Referring to FIG. 8, metadata 800 of an image may be formed as parts of information 811 and 820 are altered or added (e.g., updated) in the metadata 710 of the first image shown in FIG. 7. According to an embodiment of the present disclosure, a corresponding image may be formed in such a way that, as the image increases in resolution in a server 106 collecting a plurality of images (e.g., www.samsung), the degree of division is increased from the primary order to the third order and a particular portion of the image is expressed in terms of depth, compared to the previous state, (for example, the depth unit of a particular secondary block is set to 50 centimeters). As the image is altered as described above, the information 811 regarding the degree (or level) of division of the image from among the metadata 800 of the image may be altered from data representing the primary order in the degree of division (e.g., [0]) to data representing the tertiary order (e.g., [0,0,0]). In addition, metadata 820 of the primary block corresponding to newly divided secondary blocks may be added.

According to an embodiment of the present disclosure, when the degree of image blocks is altered in a device (e.g., server 106) that differs from a device that created (took) the first image, the information (e.g., www.samsung), indicating the device where the degree of image blocks was altered, may be added to or altered in metadata 820 of the primary block corresponding to the secondary blocks additionally divided by the alteration process, as at least part (e.g., owner, etc.) of the photography conditions 822 of the primary block. According to another embodiment of the present disclosure, when the degree of blocks of an image is altered in the same electronic device that took the image or is not altered, since the respective blocks have the same photography conditions as the whole image, the metadata may be implemented in such a way as to not include information regarding photography conditions, as information regarding the respective blocks; or to make a corresponding field empty or include a letter, number or mark (e.g., "null" or "0"), which does not indicate particular information in that field.

Referring to metadata 820 of the primary block, the secondary blocks divided from a corresponding primary block was created on Jul. 10, 2013, and the device where the segmentation of the secondary blocks occurred may be a device (or server 106) linked to the URL of www.samsung (reference number 822). The resolution of each of the primary blocks may be 516×387 (reference number 823). Each of the primary blocks divided into secondary blocks may have 108 secondary blocks in the form of 12×9 (reference number 824). The depth unit of the secondary blocks of a corresponding primary block may be 50 centimeters (reference number 826).

According to an embodiment of the present disclosure, when the electronic device obtains additional information related to an image, it may increase the degree of image division based on the additional information, and also metadata corresponding to the increased degree of image division based on the previous metadata and the additional information. For example, when the electronic device obtains additional information capable of increasing the degree of image division to the third order, related to an image corresponding to metadata 800, it increases the degree of image division of a corresponding image to the third order, and also creates new metadata based on metadata 810 corresponding to an image, metadata 820 of the primary block, metadata of the secondary block or additional information.

Figure 9:
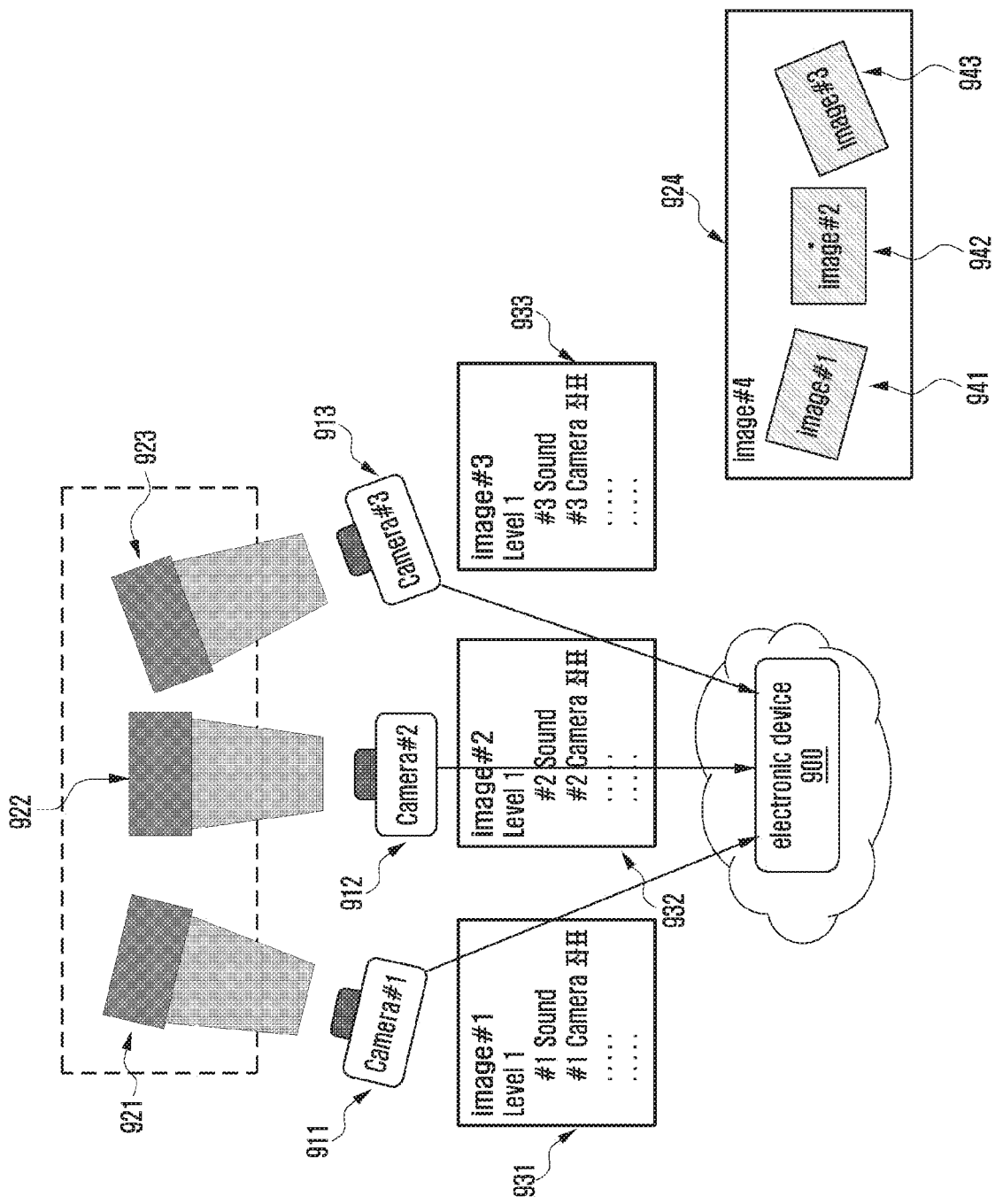
FIG. 9 is a diagram that describes a method of combining images obtained from a plurality of camera modules in an electronic device according to an embodiment of the present disclosure.

FIG. 9 is a diagram that describes a method of combining images obtained from a plurality of camera modules in an electronic device according to an embodiment of the present disclosure. Referring to FIG. 9, the electronic device 900 (e.g., electronic device 101 or server 106) is capable of obtaining a plurality of images 921~923 via a plurality of camera modules 911~913. The electronic device 900 is also capable of obtaining metadata 931~933 of a plurality of images 921~923, along with the plurality of images 921~923.

According to an embodiment of the present disclosure, the electronic device 900 is capable of combining a plurality of images 921~923 to create at least one compound image 924. For example, the plurality of images 921~923 may include images taken of the same object (or subject) by varying at least part of the photography conditions (e.g., a photographic view, a photographic composition, a photographic date, a photographic time, a photographic location, a temperature when taking a photograph, a photographic illuminance, camera settings, etc.). The plurality of images 921~923 may also include images taken of the objects (or subjects) that are adjacent to each other, with the photography conditions (e.g., a photographic view, a photographic composition, a photographic date, a photographic time, a photographic location, temperature when taking a photograph, a photographic illuminance, camera settings, etc.), all of which are the same or at least part of which are different from each other. In addition, the plurality of images 921~923 may include images created (e.g., compounded) or altered (e.g., by image processing) from at least one image.

According to an embodiment of the present disclosure, the electronic device 900 may combine a plurality of images 921~923 (corresponding to the objects (or subjects) that are located at the same location or adjacent locations) to create a compound image 924 so that at least one block of the compound image 924 corresponds to at least one of the plurality of images 921~923. When the plurality of images 921~923 are taken from objects adjacent to each other, the compound image 924 may be an image (e.g., panorama image) including the objects corresponding to the plurality of images 921~923. In addition, when the electronic device 900 combines a plurality of images 921~923 (corresponding to the objects (or subjects) that are located at the same location or adjacent locations) to create a compound image 924, it may create metadata of the compound image 924 based on the metadata of the plurality of images 921~923.

According to an embodiment of the present disclosure, at least part (e.g., primary blocks) 941~943 of the blocks of the compound image 924 may correspond to the plurality of images 921~923 respectively. Image attribute information (e.g., depth or resolution) of a block corresponding to at least one of the plurality of images 921~923 from among the blocks of the compound image 924 may be set based on the image attribute information (e.g., depth or resolution) corresponding to the at least one image.

According to an embodiment of the present disclosure, when the electronic device 900 combines a plurality of images 921~923 (corresponding to the objects (or subjects) that are located at the same location or adjacent locations) to create a compound image 924, it may create metadata of the compound image 924 based on the metadata of the plurality of images 921~923. The electronic device 900 may set at least part (e.g., depth or resolution) of the image attribute information corresponding to at least one of the plurality of images 921~923 as image attribute information of a block corresponding to the at least one image. The image attribute information corresponding to at least one of the plurality of images 921~923 may be obtained from metadata corresponding to the at least one image.

According to an embodiment of the present disclosure, when particular image attributes (e.g., depths) of a plurality of images 921~923 are substantially identical to each other or are within a range where they can be identically processed or adjusted by the computing capability of the electronic device 900, the electronic device 900 may create the compound image 924 so that blocks corresponding to each of the plurality of images 921~923 have the same degrees (levels), respectively. For example, the electronic device 900 may create at least parts 941~943 of the blocks of the compound image 924 based on each of the plurality of images 921~923. In this case, the electronic device 900 may process or adjust at least one of the plurality of images 921~923 so that particular image attributes (e.g., depth) of the plurality of images 921~923 can be identical to each other, thereby altering the metadata of the corresponding image. When the first image 921, second image 922 and third image 923 have the depth unit of approximately 50 centimeters, respectively, the electronic device 900 may create a compound image 924 so that: the first block 941, second block 942 and third block 943 of the primary blocks of the compound image 924 are formed based on the first image 921, second image 922 and third image 943, respectively; and the overall depth unit of the compounded image 924 is set to a value (e.g., approximately 1 meter) greater than 50 centimeters. In this case, from among the metadata of the compound image 924, at least part of the metadata of the first block 941 may be created based on the metadata of the first image 921, at least part of the metadata of the second block 942 may be created based on the metadata of the second image 922, and at least part of the metadata of the third block 943 may be created based on the metadata of the third image 923.

According to an embodiment of the present disclosure, when the first image 921 and second image 922 have the depth unit of approximately 50 centimeters, respectively, and the third image 923 has the depth unit of approximately 40 centimeters, the electronic device 900 may perform an image processing to adjust the depth of the third image 923 so that the depth unit of the third image 923 is approximately 50 centimeters; and may create a compound image 924 so that: the first block 941, second block 942 and third block 943 of the primary blocks of the compound image 924 are formed based on the first image 921, second image 922 and third image 923 of which depth is adjusted, respectively; and the overall depth unit of the compounded image 924 is set to a value (e.g., approximately 1 meter) greater than 50 centimeters. In this case, from among the metadata of the compound image 924, at least part of the metadata of the first block 941 may be created based on the metadata of the first image 921, at least part of the metadata of the second block 942 may be created based on the metadata of the second image 922, and at least part of the metadata of the third block 943 may be created by altering at least part of the metadata of the third image 923.

According to an embodiment of the present disclosure, when the first image 921 and second image 922 have the depth unit of approximately 50 centimeters, respectively, and the third image 923 has the depth unit of approximately 10 centimeters, the electronic device 900 may create a fourth image 926 that includes the same subject as the third image 923 and has the depth unit of approximately 10 centimeters, based on the third image 923 and at least one of the other images; and may create a compound image 924 so that the first block 941, second block 942 and third block 943 of the primary blocks of the compound image 924 are formed based on the first image 921, second image 922 and fourth image 926, respectively; and at least one sub-block of the third block 943 (i.e., the secondary block corresponding to the third block 943 as the primary block) is formed based on the third image 923. In this case, the overall depth unit of the compound image 924 may be set to a value (e.g., approximately 1 meter) greater than 50 centimeters, and the depth units corresponding to the primary block and the secondary block may be 50 centimeters and 10 centimeters, respectively. In addition, from among the metadata of the compound image 924, at least part of the metadata of the first block 941 may be created based on the metadata of the first image 921, at least part of the metadata of the second block 942 may be created based on the metadata of the second image 922, and at least part of the metadata of the third block 943 may be created by altering at least part of the metadata of the third image 923.

According to an embodiment of the present disclosure, when the first block 941, second block 942, and third block 943 of the primary blocks of the compound image 924 are formed based on the first image 921, second image 922, and third image 923, respectively, the electronic device 900 may set a particular portion (e.g., the field of owner) of the metadata of the first to third blocks to at least one of identification information (e.g., file name) of an image (e.g., one of the first to third images 921~923) corresponding to each block and identification information (e.g., device ID, user ID, user name, IP address or URL, etc.) regarding an electronic device that provided the corresponding image. In addition, when the third block 943 is formed based on the third image 923 of which the particular image attribute (e.g., depth) is adjusted, a particular portion (e.g., the field of owner) of the metadata of the third block may be set to at least one identification information (e.g., file name) of the third image; identification information (e.g., device ID, user ID, user name, IP address or URL, etc.) regarding a device that provided the third image; and identification information (e.g., device ID, user ID, user name, IP address or URL, etc.) regarding a device (e.g., electronic device 900) that adjusted the particular image attribute (e.g., depth) of the third image.

Figure 10:
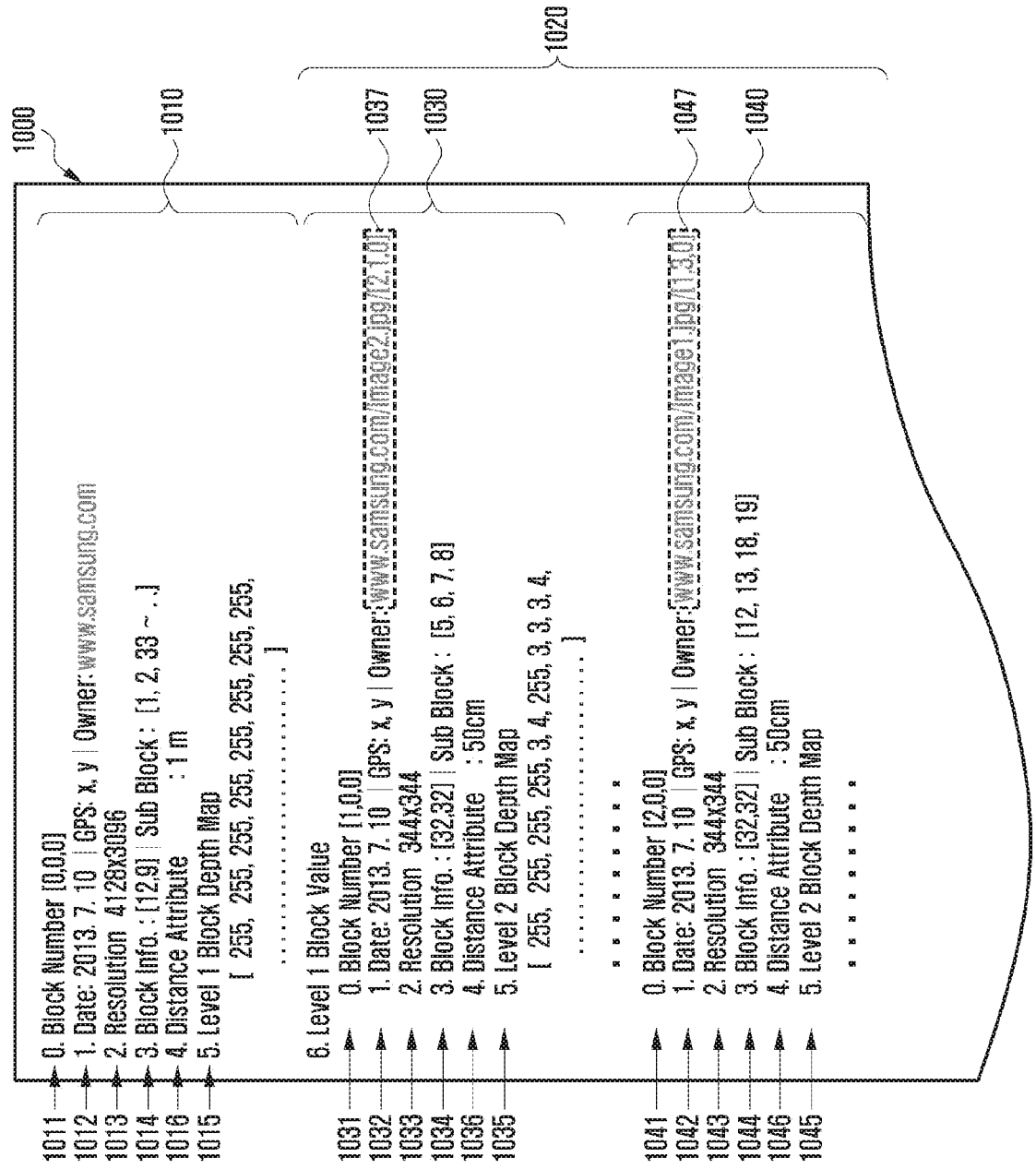
FIG. 10 is a diagram of metadata created by combining a plurality of images according to an embodiment of the present disclosure.

FIG. 10 is a diagram of metadata created by combining a plurality of images. According to an embodiment of the present disclosure, the electronic device (e.g., electronic device 101 or server 106) is capable of combining first and second images to create a third image (e.g., image3.jpg). The third image may be divided into a plurality of blocks including first and second blocks. The third image may be created so that the first image and second images correspond to the first and second blocks, respectively. The electronic device and other devices may store the first and second images in one of an image file or blocks of the image file, sub-blocks, and multi-sub-blocks.

Referring to FIG. 10, metadata 1000 of the compound image (e.g., the third image) includes a first section of metadata (first metadata section) 1010 and a second section of metadata (second metadata section) 1020. According to an embodiment of the present disclosure, the first metadata section 1010 includes information 1011 regarding the degree (level) of division in a compound image, creation conditions 1012 (e.g., date, GPS, owner, etc.), resolution 1013, segmentation information 1014 regarding blocks (e.g., information identifying blocks divided into a plurality of sub-blocks from among the blocks, segmentation form, etc.), block depth map 1015 and depth unit information 1016 regarding sub-blocks. The first metadata section 1010 may further include information regarding other attributes related to blocks, e.g., information regarding an edge map or ray tracing. The information included in the first metadata section 1010 may be created by the process of combining the first and second images. At least part of the information included in the first metadata section 1010 may be created, based on the metadata of the first image (e.g., metadata 710 shown in FIG. 7) and the metadata of the second image (e.g., metadata 720 shown in FIG. 7).

According to an embodiment of the present disclosure, the second metadata section 1020 includes information 1031 identifying the primary blocks corresponding to the first image, photography conditions 1032, resolution 1033, segmentation information 1034 (e.g., information identifying sub-blocks divided into a plurality of multi-sub-blocks from among the sub-blocks of the primary block, segmentation form, etc.), depth map 1035 of the sub-blocks, and the depth unit information 1036 of the sub-blocks. The second metadata section 1020 may further include information regarding other attributes related to the primary block, e.g., information regarding an edge map or ray tracing.

At least part of the information 1031~1036 may be created, based on at least metadata of the first image (e.g., reference number 710 shown in FIG. 7). In addition, a particular portion (e.g., owner) of the information may be set to at least one identification information (e.g., file name) of the first image, the storage location (reference number 1037), and identification information (e.g., device ID, user ID, user name, IP address or URL, etc.) regarding an electronic device that provided the first image. According to an embodiment of the present disclosure, the information set the same as the metadata of the first image from among the information 1031-1036, may be replaced with the first image or the storage location 1037 of the metadata of the first image. For example, in the process of creating metadata of a compound image, the electronic device is capable of inserting information about the storage location 1037 of metadata of the first image or the first image into part of the information 1031~1036, and omitting information set in the same way as the metadata of the first image from among the information 1031~1036.

According to an embodiment of the present disclosure, the second metadata section 1020 includes information 1041 identifying the secondary block corresponding to the second image, photography conditions 1042, resolution 1043, segmentation information 1044 (e.g., information identifying sub-blocks divided into a plurality of multi-sub-blocks from among the sub-blocks of the secondary block, segmentation form, etc.), depth map 1045 of the sub-blocks, and the depth unit information 1046 of the sub-blocks. The second metadata section 1020 may further include information regarding other attributes related to the secondary block, e.g., information regarding an edge map or ray tracing.

At least part of the information 1041~1046 may be created, based on at least metadata of the second image (e.g., reference number 720 shown in FIG. 7). In addition, a particular portion (e.g., owner) of the information may be set to at least one of the following: identification information (e.g., file name) of the second image, the storage location (reference number 1047), and identification information (e.g., device ID, user ID, user name, IP address or URL, etc.) regarding an electronic device that provided the second image. According to an embodiment of the present disclosure, the information set the same as the metadata of the second image from among the information 1041-1046, may be replaced with the second image or the storage location 1047 of the metadata of the second image. For example, in the process of creating metadata of a compound image, the electronic device is capable of inserting information about the storage location 1047 of metadata of the second image or the second image into part of the information 1041~1046, and omitting information set in the same way as the metadata of the second image from among the information 1041~1046.

Referring to metadata 1000 of the compound image, the compound image is divided into 108 blocks in the form of 12×9, and shows that the original image corresponding to the first one of the blocks is stored as the first one of the secondary blocks of the second one of the primary blocks of the first image (e.g., image2.jpg) stored in a corresponding electronic device; and the original image corresponding to the second block is stored as the third one of the secondary blocks of the first one of the primary blocks of the second image (e.g., image1.jpg) stored in a corresponding electronic device. Therefore, when an image is combined or compounded in the unit of a block, information regarding the original image and information indicating blocks that were combined from among the blocks may be stored at least as part of metadata of the compound image.

Figure 11:
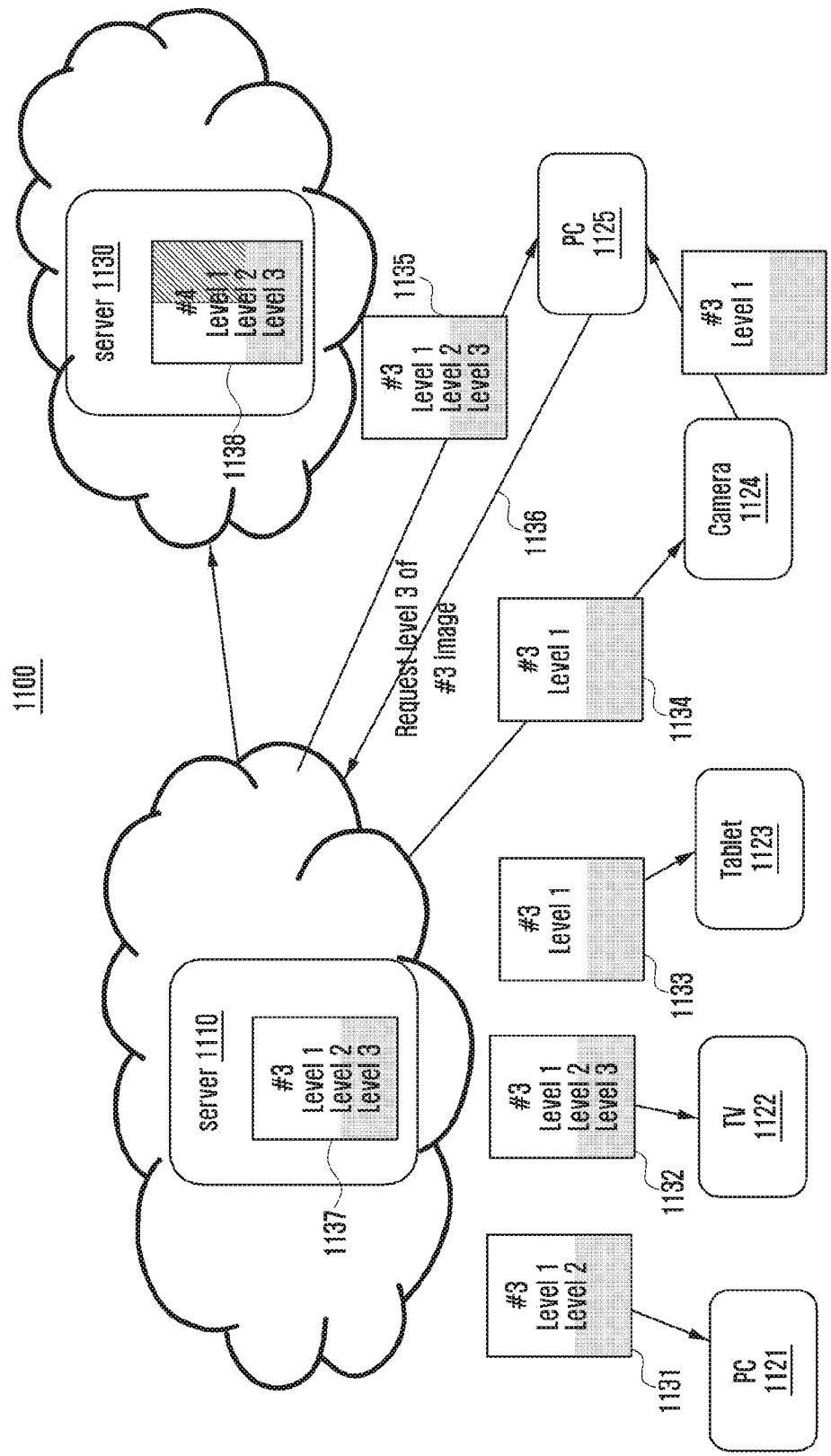
FIG. 11 is a diagram showing a system that shares multi-level-based images according to an embodiment of the present disclosure.

FIG. 11 is a diagram showing a system 1100 that shares multi-level-based images according to an embodiment of the present disclosure. Referring to FIG. 11, the sharing system 1100 is capable of including, for example, a server 1110 (e.g., server 106) and a plurality of electronic devices 1121 to 1125 (e.g., electronic devices 101, 102 and 104).

According to an embodiment of the present disclosure, the server 1110 is capable of collecting images that are taken, created or stored in a plurality of electronic devices 1121~1125, from the plurality of electronic devices 1121~1125. The first electronic device 1121 may be implemented in such a way that it selectively designates images that can be provided to or shared with a server 1110, external devices (e.g., second to fifth electronic devices 1122 to 1125), etc., from among the images taken, created or stored in the first electronic device 1121 and the designated images are provided to or shared with the server 1110 or the external devices. The second to fifth electronic devices 1122 to 1125 may also be implemented in the same way as the first electronic device 1121.

According to an embodiment of the present disclosure, the server 1110 may combine images obtained by a plurality of electronic devices 1121 to 1125 or images created or stored in the server 1110 or alter them to create other images. The server 1110 combines images that are related to each other from among images collected by the server 1110, for example, images taken of the same object (or subject) by varying at least part of the photography conditions (e.g., photographing device, photographing resolution, GPS, photographic composition/view, or photographic date/time, etc.), and images taken of the objects (or subjects) adjacent to each other, with the photography conditions (e.g., photographing device, photographing resolution, GPS, photographic composition/view, or photographic date/time, etc.), all of which are the same or at least part of which are different from each other, to create a compound image (e.g., a panorama image).

According to an embodiment of the present disclosure, the compound image may include multi-level blocks. In addition, metadata of the compound image may include metadata corresponding to each of the multi-level blocks. The compound image may be formed in such a way that at least one of the original images to be combined corresponds to at least one of the multi-level blocks. In this case, metadata of a block corresponding to the original image from among the metadata of the compound image may be created, based on metadata of the original image. The compound image may be formed in such a way that at least part of the metadata of a block corresponding to the original image includes information indicating the storage location of the metadata of the original image or the original image; and part of the information, which is the same as the metadata of the original image from among the metadata of a block corresponding to the original image, is omitted. The compound image may also be implemented in various ways and not limited to the embodiments and implementations described above.

According to an embodiment of the present disclosure, the server 1110 is capable of receiving requests for images from a plurality of electronic devices 1121 to 1125 and providing images to the electronic devices according to the image requests. When the requested images are multi-level images, e.g., images including multi-level blocks, the server 1110 may provide the images in one of the plurality of levels. When a requested image is a 3-level image, i.e., an image including the primary, secondary and tertiary blocks, the server 1110 may provide the image in one of the following: level 1, level 2 and level 3. For example, when the server 1110 provides an image in level 1, it may provide metadata (e.g., first metadata 730) related to a layer corresponding to level 1, as metadata of the image to be provided, along with the image (e.g., reference numbers 1131 and 1134). When the server 1110 provides an image in level 2, it may provide metadata (e.g., first metadata 730) related to a layer corresponding to level 1 and metadata (e.g., second metadata 740) related to a layer corresponding to level 2, as metadata of the image to be provided, along with the image (e.g., reference number 1131). When the server 1110 provides an image in level 3, it may provide metadata (e.g., metadata 720) stored, related to the image or metadata related to layers corresponding to level 1, level 2, and level 3, as metadata of the image to be provided along with the image (e.g., reference numbers 1132 and 1135). Although the embodiment is described in such a way that regarding the function of providing images in a particular level, provision of the image itself is performed by providing the same image regardless of the levels, it should be understood that the present disclosure is not limited to the described embodiments. For example, the levels may be implemented in such a way as to correspond to particular attributes (e.g., resolution, size, etc.) of the image. The server 1110 is capable of altering (or adjusting) a particular attribute of an image based on the levels, and transmitting the altered (adjusted) image.

According to an embodiment of the present disclosure, when the requested images are multi-level images, e.g., images including multi-level blocks, the server 1110 is capable of determining the level of images to be provided, based on the capability, the display resolution, etc., of the electronic device that transmitted the image request. When the server 1110 receives requests for images from devices of a relatively low level of capability, such as a third electronic device 1123 (e.g., a portable tablet) or a fourth electronic device 1124 (e.g., a smart camera), it is capable of determining the level of images to be provided as level 1 (reference numbers 1133 and 1134). When the image is a 3-level image 1137, i.e., an image including three tertiary blocks, and the server 1110 receives requests for images from devices of a relatively high level of capability, such as a first electronic device 1121 (e.g., a desktop or laptop computer) or a second electronic device 1122 (e.g., TV), it is capable of determining the level of images to be provided as level 2 or level 3 (reference numbers 1131 and 1132). When the first electronic device 1121 has the display resolution of high definition and the second electronic device 1122 has a higher display resolution than the first electronic device 1121, e.g., full-high definition (FHD), quad-high definition (QHD) or ultra-high definition (UHD), the server 1110 is capable of providing images in a higher level (e.g., level 3) than the level (e.g., level 2) that the first electronic device 1121 provides images in.

According to an embodiment of the present disclosure, the plurality of electronic devices 1121 to 1125 are capable of transmitting to the server 1110, an image request 1136 including level information related to image provisioning. The server 1110 may determine a level of images to be provided, based on the level information included in the request 1136. The server 1110 may determine the level of images to be provided as the same level as the level information included in the image providing request 1136 (reference number 1135). The server 1110 may also determine the level of images to be provided, based on the level information included in the image request and other information, e.g., the capability, display resolution, etc., of an electronic device that requested images (e.g., fifth electronic device 1125). For example, the server 1110 may compare the level information corresponding to the capability or display resolution of an electronic device that requested images (e.g., fifth electronic device 1125) with the level information included in the image providing request, and determine the level of images to be provided as the highest (or lowest) one of the two levels. This embodiment for determining the level of images to be provided is just an example and the disclosure is not limited thereto. It should be understood that there are many modifications of the embodiments of the present disclosure. For example, the server 1110 may determine the level of images to be provided, based on other information included in the image request. This will be described later, with additional embodiments, referring to FIG. 12.

According to an embodiment of the present disclosure, the server 1110 is capable of providing the created or stored images or the images obtained from the plurality of electronic devices 1121 to 1125 to an external server 1130 that collects images. The external server 1130 may provide images received from the server 1110, to other electronic devices or may combine the received images with other images to create another image 1138. The external server 1130 may be a device that is the same or different type as the server 1110.

According to an embodiment of the present disclosure, the sharing system 1100 is capable of including one or more groups of servers. A part or all of the operations executed on the server 1110 may also be executed on one or more electronic devices (e.g., first to fifth electronic devices 1121 to 1125 or external server 1130). When the server 1110 needs to provide functions or services in an automatic manner or according to a request, it may not perform the functions or services, but instead request other devices (e.g., first to fifth electronic devices 1121 to 1125 or external server 1130) to execute at least part of the functions related to the functions or services. In this case, the first to fifth electronic devices 1121 to 1125 or external server 1130 execute the requested functions or additional functions and may transmit the results to the server 1110. The server 1110 may process the received result or with additional processes to provide the requested functions or services. To this end, the system may employ cloud computing, distribution computing or client-server computing technology.

Figure 12:
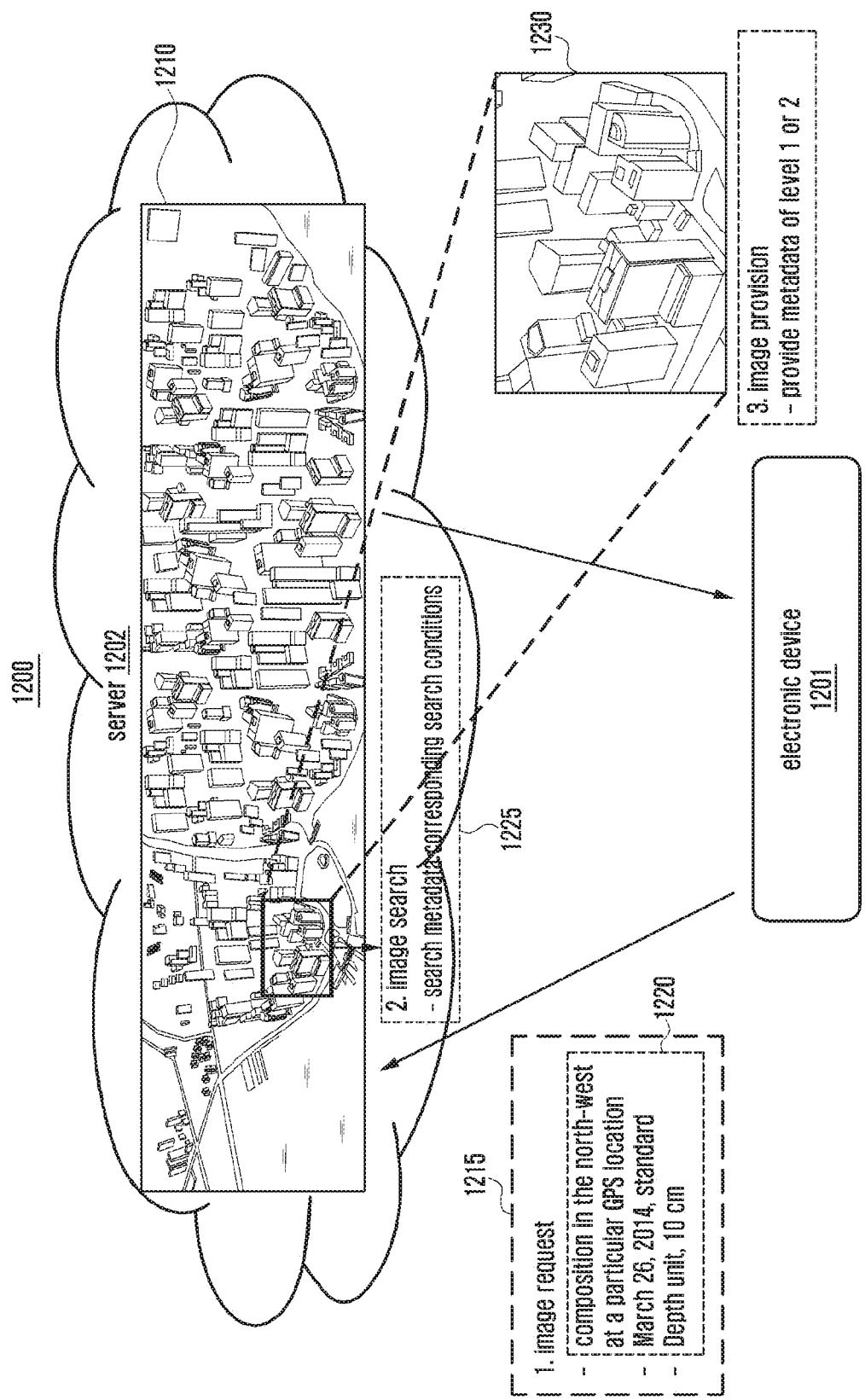
FIG. 12 is a diagram showing a system that searches for multi-level blocks of an image according to an embodiment of the present disclosure.

FIG. 12 is a diagram showing a system 1200 that searches for multi-level blocks of an image according to an embodiment of the present disclosure. Referring to FIG. 12, the search system 1200 is capable of an electronic device 1201 and a search server 1202. The electronic device 1201 is capable of transmitting an image search request including a search condition 1220 in relation to a particular image 1210 to the search server 1202 in step 1215. The search condition 1220 may be formed by combining one or more of the items of information included in metadata of an image photography conditions (e.g., photographic composition 1221, photographic location 1222, photographic date 1223, owner, etc.), an image attribute (e.g., resolution 1224 or depth 1225), and information regarding a subject.

According to an embodiment of the present disclosure, the search server 1202 is capable of searching for blocks included in a corresponding image 1210, by using metadata of the image 1210, based on the search condition 1220, in step 1225. The search server 1202 is capable of searching the metadata forming a multi-level hierarchical structure for a block (or a sub-block) 1230 corresponding to at least part (e.g., photographic location 1222) of the search condition 1220. The search server 1202 is capable of determining the level of blocks, based on other parts of the search condition 1220 (e.g., resolution 1224 and depth 1225). For example, when the searched block corresponds to a low level of sub-block in the hierarchical structure, the search server 1202 may search for a low level of sub-block corresponding to other parts of the search condition 1220 (e.g., resolution 1224 and depth 1225). When a plurality of seared blocks (or sub-blocks) are searched, the search server 1202 is capable of selecting blocks (or sub-blocks) corresponding to metadata closest to other parts of the search condition 1220 from among the plurality of blocks (sub-blocks).

According to an embodiment of the present disclosure, the search server 1202 is capable of transmitting to the electronic device 1201, metadata corresponding to the searched block (or sub-block) 1230 as at least part of the reply to the search request, in step 1235. The search server 1202 is also capable of transmitting divided images corresponding to the search block (or sub-block) 1230, an original image corresponding to the search block (or sub-block) 1230 or the storage location of the original image, via a reply or a separate message in response to the search request.

Figure 13:
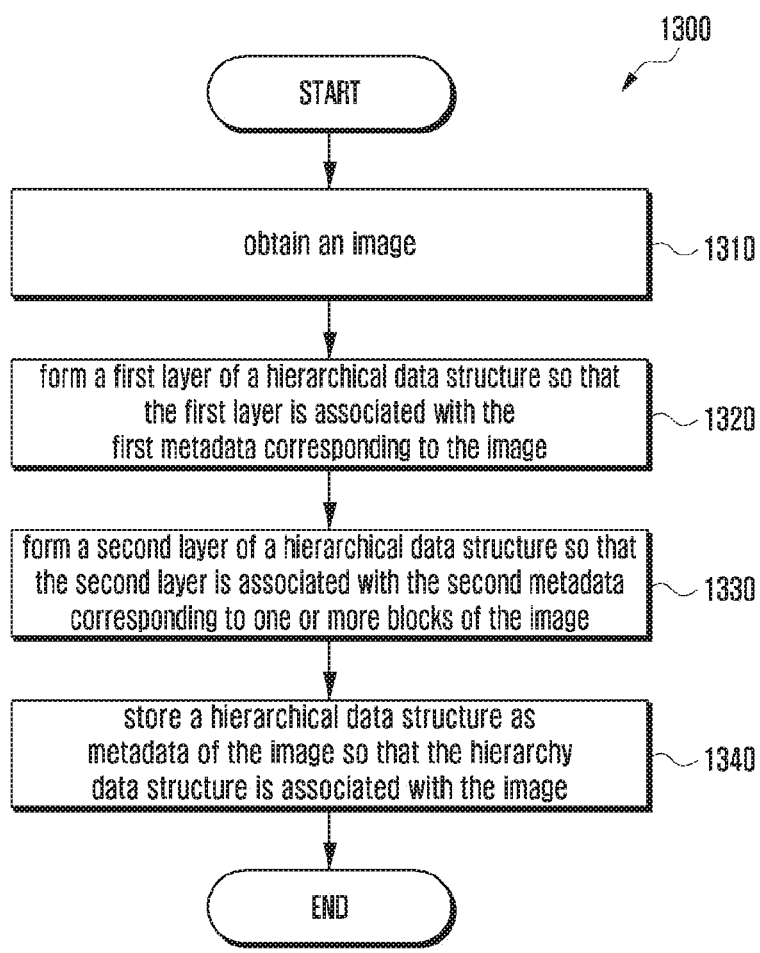
FIG. 13 is a flowchart of a method of storing metadata in an electronic device according to an embodiment of the present disclosure.

FIG. 13 is a flowchart 1300 of a method of storing metadata in an electronic device according to an embodiment of the present disclosure.

Referring to FIG. 13, the electronic device is capable of obtaining an image in step 1310.

The electronic device is capable of forming a first layer of a hierarchical data structure including a plurality of layers (e.g., first layer, second layer, etc.) so that the first layer is associated with the first metadata corresponding to the image in step 1320. The hierarchical data structure is formed in multi-levels. The first layer corresponds to level 1 and the second layer corresponds to level 2 lower than level 1.

The electronic device forms a second layer of a hierarchical data structure so that the second layer is associated with the second metadata corresponding to one or more of the plurality of blocks into which the image is divided in step 1330.

The electronic device is capable of storing a hierarchical data structure as metadata of the image so that the hierarchical data structure is associated with the image, in step 1340. According to an embodiment of the present disclosure, the electronic device is capable of storing a corresponding image so that a hierarchical data structure is included in a part of the image or linked to the image by part the image.

Figure 14:
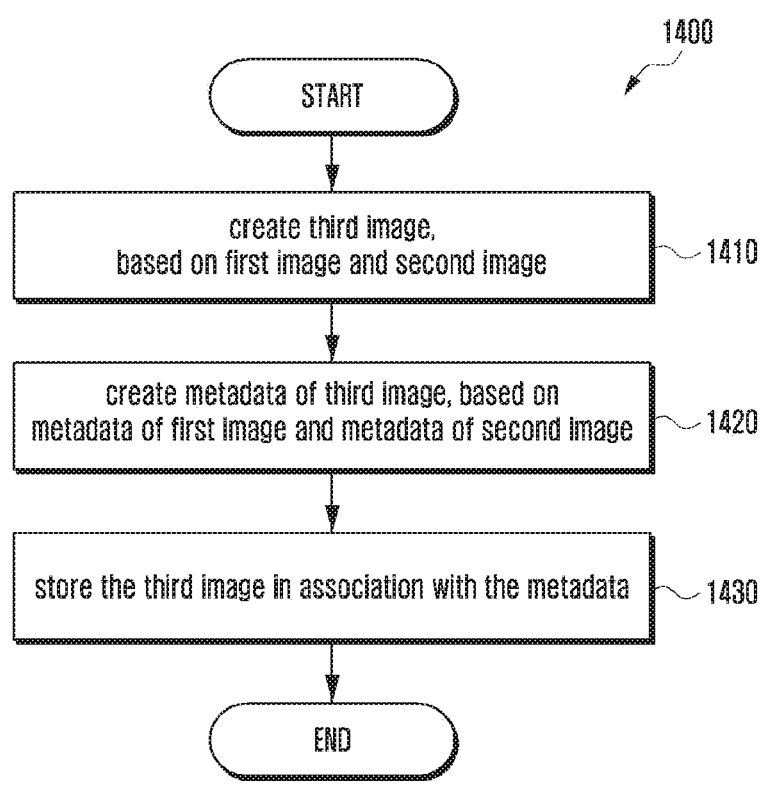
FIG. 14 is a flowchart of a method of creating an image in an electronic device according to an embodiment of the present disclosure.

FIG. 14 is a flowchart 1400 of a method of creating an image (e.g., third image) in an electronic device according to an embodiment of the present disclosure.

The electronic device is capable of creating a third image based on at least a first image and a second image in step 1410. According to an embodiment of the present disclosure, the electronic device is capable of combining first and second images to create a third image. In this case, the first and second images differ from each other in terms of at least one of the following: a photographic composition, a photographic view, a photographic date, a photographic time, a photographic location, a temperature when taking a photograph, a photographic illuminance, camera settings, and a sound.

The electronic device is capable of creating metadata of a third image, based on metadata of a first image and metadata of a second image in step 1420. According to an embodiment of the present disclosure, the metadata of a first image may include first metadata corresponding to one or more of a plurality of primary blocks into which the first image is divided into. The metadata of a second image may include second metadata corresponding to one or more of a plurality of secondary blocks into which the second image is divided into. The metadata of a third image may include third metadata corresponding to one or more of a plurality of tertiary blocks into which the third image is divided into. The electronic device is capable of creating the third metadata, based on at least part of the first metadata and at least part of the second metadata.

The electronic device is capable of storing the third image so that the metadata of the third image is associated with the third image in step 1430.

Figure 15:
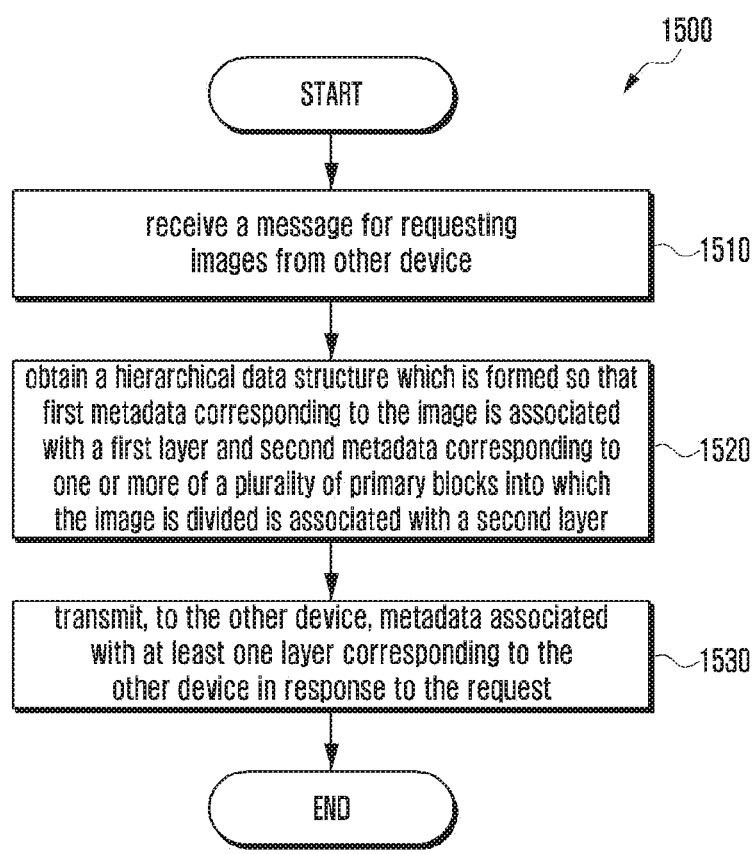
FIG. 15 is a flowchart of a method of performing transmission of metadata of an image in an electronic device according to an embodiment of the present disclosure.

FIG. 15 is a flowchart of a method of performing transmission of metadata of an image in an electronic device according to an embodiment of the present disclosure.

The electronic device is capable of receiving a message requesting images (called an image request) from other external devices in step 1510.

The electronic device is capable of obtaining a hierarchical data structure in step 1520. The hierarchical data structure is formed so that first metadata corresponding to the image is associated with a first layer and second metadata corresponding to one or more of a plurality of primary blocks into which the image is divided is associated with a second layer.

The electronic device is capable of transmitting to the other device, metadata associated with at least one layer corresponding to the other device from among a plurality of layers, as at least part of the reply in response to the request, based on information related to the other device, in step 1530.

The operations performed according to the methods shown in FIGS. 13 to 15 may be executed in serial, parallel, repetitive or heuristic fashion. Part of the operations may be performed in any other order, skipped, or performed with additional operations.

A metadata storing method according to an embodiment of the present disclosure may include obtaining an image in an electronic device; associating first metadata corresponding to the image with a first layer of a hierarchical data structure, wherein the hierarchical data structure includes a plurality of layers, including the first layer and a second layer; associating second metadata with the second layer, wherein the second metadata corresponds to one or more of a plurality of blocks into which the image is divided; and storing the hierarchical data structure in association with the image in a storage unit operatively coupled to the electronic device.

According to an embodiment of the present disclosure, the second layer may be formed to be lower than the first layer in the hierarchical data structure.

According to an embodiment of the present disclosure, the step of associating first metadata with a first layer may include storing the first metadata in a first data area of the storage unit which corresponds to the first layer or in a second data area to which data stored in the first data area is linked.

According to an embodiment of the present disclosure, the step of associating second metadata with the second layer may include storing the second metadata in a third or fourth data area of the storage unit which corresponds to the second layer.

According to an embodiment of the present disclosure, the step of storing the hierarchical data structure may include storing the image so that the hierarchical data structure is included in or linked to a part of the image.

According to an embodiment of the present disclosure, the part of the image may include the header of the image and/or a specified portion between the header and the body of the image.

According to an embodiment of the present disclosure, the step of storing the hierarchical data structure may include providing an external device with the hierarchical data structure, as at least part of the image or at least part of other data associated with the image.

According to an embodiment of the present disclosure, the step of storing the hierarchical data structure may include obtaining additional information associated with the image; creating third metadata based on the additional information and at least one of the second metadata or the first metadata; and associating the third metadata with the first layer, the second layer or a third layer of the hierarchical data structure.

According to an embodiment of the present disclosure, the method may further include associating third metadata, which corresponds to one or more of a plurality of sub-blocks into which at least one of the blocks is divided, with a third layer of the hierarchical data structure.

According to an embodiment of the present disclosure, the first metadata may include at least one of the following: information regarding the plurality of layers, segmentation information regarding the plurality of blocks, and identification information identifying one or more of the blocks.

According to an embodiment of the present disclosure, the first metadata may include at least one of the following:

a resolution, a depth, photography conditions and subject information, related to the image. The second metadata may include at least one of a resolution, a depth, photography conditions and subject information, related to one or more of the blocks.

According to an embodiment of the present disclosure, the second metadata may include at least one of segmentation information regarding the plurality of sub-blocks and identification information indicating one or more of the sub-blocks.

A metadata creating method according to an embodiment of the present disclosure may include creating, based on at least a first image and a second image, a third image including at least part of the first image and at least part of the second image; creating metadata of the third image, based on metadata of the first image and metadata of the second image; and storing the metadata of the third image in association with the third image in a storage unit operatively coupled to an electronic device. The metadata of the first image may include first metadata corresponding to one or more of a plurality of primary blocks into which the first image is divided. The metadata of the third image may include second metadata corresponding to one or more of a plurality of secondary blocks into which the third image is divided.

According to an embodiment of the present disclosure, the metadata of the second image may include third metadata corresponding to one or more of a plurality of tertiary blocks into which the second image is divided.

According to an embodiment of the present disclosure, the step of creating metadata of the third image may include creating the second metadata, based on at least part of the first metadata and at least part of the third metadata.

According to an embodiment of the present disclosure, at least one of a photographic view, a photographic composition, a photographic date, a photographic time, a photographic location, a temperature when taking a photograph, a photographic illuminance, and camera settings, related to the first image may differ from at least one of a photographic view, a photographic composition, a photographic date, a photographic time, a photographic location, a temperature when taking a photograph, a photographic illuminance, and camera settings, related to the second image. The first and second images may differ from each other in terms of at least one of a photographic view, a photographic composition, a photographic date, a photographic time, a photographic location, a temperature when taking a photograph, a photographic illuminance, and camera settings.

A metadata providing method of an electronic device according to an embodiment of the present disclosure may include receiving a request message for requesting an image from an external device; obtaining a hierarchical data structure that includes a plurality of layers including at least a first layer and a second layer, wherein the hierarchical data structure is created so that first metadata corresponding to the image is associated with the first layer and second metadata, which corresponds to one or more of a plurality of primary blocks into which the image is divided, is associated with the second layer; and transmitting to the external device, metadata associated with at least one layer corresponding to the external device from among the plurality of layers, as at least part of a reply in response to the request, based on the information related to the external device.

According an embodiment of the present disclosure, the plurality of layers may further include a third layer. The hierarchical data structure may be formed in such a way that third metadata, which corresponds to one or more of a plurality of sub-blocks into which one of the blocks is divided, is associated with the third layer.

According to an embodiment of the present disclosure, the information related to the external device may include at least one of the capability related to the image processing function of the external device, and the display resolution of the external device.

According to an embodiment of the present disclosure, the external device may include a first external device corresponding to a first capability, and a second external device corresponding to a second capability which is higher than the first capability. The transmission of metadata to the external device may include transmitting the first metadata to the first external device; and transmitting the first metadata and the second metadata to the second external device.

According to an embodiment of the present disclosure, the external device may include a first external device corresponding to a first display resolution; and a second external device corresponding to a second display resolution which is higher than the first display resolution. The transmission of metadata to the external device may include transmitting the first metadata to the first external device; and transmitting the first metadata and the second metadata to the second external device.

As described above, the method and the electronic device adapted to the method, according to various embodiments of the present disclosure, are capable of dividing an image into a plurality of blocks and hierarchically managing metadata of all the images and metadata of every block, thereby configuring a hierarchical map associated with a specific attribute of images (e.g., depth) and more accurately managing a particular block. The method and the electronic device are also capable of hierarchically managing metadata of every block of an image where a modification or combination occurred, thereby efficiently managing details of blocks that differ from each other. In addition, the embodiments of the present disclosure can easily implement services that are capable of receiving information about a level corresponding to the availability of an electronic device (e.g., computing capability) related to images; managing images or metadata by distributing them to a plurality of electronic devices or a server; and provide the images or metadata to other electronic devices.

While the present disclosure has been particularly shown and described with reference to certain embodiments thereof, it will be understood by those skilled in the art that changes in form and details may be made therein without departing from the spirit and scope of the disclosure as defined by the appended claims.

What is claimed is:

1. An image processing method of an electronic device comprising:
   obtaining an image using a camera operably coupled with the electronic device;
   dividing the image into a plurality of image blocks;
   measuring a distance value related to the image;
   determining an image attribute for at least one of the plurality of image blocks based on the distance value;
   generating a first part of metadata corresponding to the image, wherein the metadata comprises a hierarchical data structure and the first part of the metadata is associated with a first layer of the hierarchical data structure, wherein the hierarchical data structure includes a plurality of layers;
   generating a second part of metadata corresponding to each of the plurality of image blocks, wherein the second part of metadata is associated with a second layer of the hierarchical data structure, wherein the second layer corresponds to a lower layer than the first layer in the hierarchical data structure; and storing the hierarchical data structure in association with the image in a storage unit operatively coupled to the electronic device, wherein the first part of metadata corresponding to the image comprises at least one of a photographic view, a photographic composition, a photographic date, a photographic time, a photographic location, a temperature when taking a photograph, a photographic illuminance, and camera settings, and wherein the second part of metadata corresponding to each of the plurality of image blocks comprises at least one of identification information of an image block included in the plurality of image blocks, size information of the image block, location information of the image block, color information of the image block, brightness information of the image block, depth information of the image block, and the attribute information of the image block.

2. The method of claim 1, wherein a depth of the image block is different from a depth of the image.

3. The method of claim 1, wherein generating the first part of metadata comprises:
storing the first part of metadata in a first data area of the storage unit which corresponds to the first layer or in a second data area to which data stored in the first data area is linked.

4. The method of claim 1, wherein generating the second part of metadata comprises:
storing the second part of metadata in one of a third data area and a fourth data area of the storage unit which corresponds to the second layer.

5. The method of claim 1, wherein storing the hierarchical data structure comprises:
storing the image so that the hierarchical data structure is included in or linked to a part of the image.

6. The method of claim 5, wherein the part of the image comprises:
one of a header of the image and a specified portion between the header and a body of the image.

7. The method of claim 1, wherein storing the hierarchical data structure comprises:
providing an external device for storing the hierarchical data structure, as at least part of the image or at least part of other data associated with the image.

8. The method of claim 1, wherein storing the hierarchical data structure comprises:
obtaining additional information associated with the image;
generating a third part of metadata based on the additional information, and at least one of the second part of metadata and the first part of metadata; and
associating the third part of metadata with the first layer, the second layer or a third layer of the hierarchical data structure.

9. The method of claim 1, wherein the first part of metadata comprises at least one of:
information regarding the plurality of layers, segmentation information regarding the plurality of image blocks, and identification information identifying one or more of the image blocks.

10. The method of claim 1, wherein:
the first part of metadata comprises at least one of a resolution, a depth, photography conditions and subject information, related to the image; and the second part of metadata comprises at least one of a resolution, a depth, photography conditions and subject information, related to one or more of the plurality of image blocks.

11. The method of claim 1, further comprising:
generating a third part of metadata, which corresponds to each of a plurality of sub-image blocks into which at least one of the plurality of image blocks is divided, wherein the third part of metadata is associated with a third layer of the hierarchical data structure.

12. The method of claim 11, wherein the third part of metadata comprises at least one of:
segmentation information regarding the plurality of sub-image blocks and identification information identifying one or more of the sub-image blocks.

13. An image processing method of an electronic device comprising:
based on at least a first image and a second image, creating a third image including at least part of the first image and at least part of the second image;
based on metadata of the first image and metadata of the second image, creating metadata of the third image;
storing the metadata of the third image in association with the third image in a storage unit operatively coupled to an electronic device;
measuring a distance value related to the first image;
determining an image attribute for at least one of a plurality of image blocks based on the distance value,
wherein the metadata of the first image comprises a hierarchical data structure, a first part of metadata corresponding to the first image and a second part of metadata corresponding to each of the plurality of image blocks into which the first image is divided, wherein the first part of the metadata is associated with a first layer of the hierarchical data structure and the second part of metadata is associated with a second layer of the hierarchical metadata structure, wherein the second layer corresponds to a lower layer than the first layer in a hierarchical data structure,
wherein the metadata of the third image comprises a third part of metadata corresponding to the third image and a fourth part of metadata corresponding to each of a plurality of image blocks into which the third image is divided,
wherein the first part of metadata comprises at least one of a photographic view, a photographic composition, a photographic date, a photographic time, a photographic location, a temperature when taking a photograph, a photographic illuminance, and camera settings, and
wherein the second part of metadata comprises at least one of identification information of an image block of the plurality of image blocks, size information of the image block, location information of the image block, color information of the image block, brightness information of the image block, depth information of the image block, and the attribute information of the image block.

14. The method of claim 13, wherein the metadata of the second image comprises:
a fifth part of metadata corresponding to the second image and a sixth part of metadata corresponding to each of a plurality of image blocks into which the second image is divided.

15. The method of claim 14, wherein creating metadata of the third image comprises:

creating the third part of metadata, based on at least part of the first part of metadata and at least part of the fifth part of metadata.

16. The method of claim 13, wherein the first and second images differ from each other in terms of at least one of:
a photographic view, a photographic composition, a photographic date, a photographic time, a photographic location, a temperature when taking a photograph, a photographic illuminance, and camera settings.

17. An image processing method of an electronic device comprising:
receiving, by an electronic device, a message requesting an image from an external device;
receiving, by the electronic device, a measured distance value related to the image;
receiving, by the electronic device, a determined image attribute for at least one of a plurality of image blocks based on the distance value;
obtaining a hierarchical data structure that includes a plurality of layers including at least a first layer and a second layer, wherein the hierarchical data structure is created so that a first part of metadata corresponding to the image is associated with the first layer, and a second part of metadata corresponding to each of the plurality of image blocks into which the image is divided is associated with the second layer, wherein the second layer corresponds to a lower layer than the first layer in the hierarchical data structure; and
transmitting to the external device, metadata associated with at least one layer corresponding to the external device from among the plurality of layers, as at least part of a reply in response to the request, based on information related to the external device,
wherein the first part of metadata comprises at least one of a photographic view, a photographic composition, a photographic date, a photographic time, a photographic location, a temperature when taking a photograph, a photographic illuminance, and camera settings, and
wherein the second part of metadata comprises at least one of identification information of an image block included in the plurality of image blocks, size information of the image block, location information of the image block, color information of the image block, brightness information of the image block, depth information of the image block, and the attribute information of the image block.

18. The method of claim 17, wherein:
the plurality of layers further comprise a third layer; and
the hierarchical data structure is formed such that a third part of metadata, which corresponds to each of a plurality of sub-image blocks into which one of the plurality of image blocks is divided, is associated with the third layer.

19. The method of claim 17, wherein the information related to the external device comprises at least one of:
a capability related to an image processing function of the external device, and a display resolution of the external device.

20. The method of claim 17, wherein:
the external device comprises:
a first external device corresponding to a first capability, and
a second external device corresponding to a second capability which is higher than the first capability; and
the transmission of metadata to the external device comprises:

transmitting the first part of metadata to the first external device, and
transmitting the first part of metadata and the second part of metadata to the second external device.

21. The method of claim 17, wherein:
the external device comprises:
a first external device corresponding to a first display resolution, and
a second external device corresponding to a second display resolution which is higher than the first display resolution; and
the transmission of metadata to the external device comprises:
transmitting the first part of metadata to the first external device, and
transmitting the first part of metadata and the second part of metadata to the second external device.

22. An electronic device comprising:
an image obtaining module executed by at least one processor that obtains an image;
a segmentation module executed by the at least one processor that divides the image into a plurality of image blocks;
a measuring module executed by the at least one processor that measures a distance value related to the image;
a determination module executed by the at least one processor the determines an image attribute for at least one of the plurality of image blocks based on the distance value;
a data structure creating module executed by the at least one processor that creates a hierarchical data structure that includes a plurality of layers including at least a first layer and a second layer, so that a first part of metadata corresponds to the image, wherein the metadata comprises a hierarchical data structure and the first part of the metadata is associated with the first layer, and a second part of metadata corresponds to each of the plurality of image blocks, wherein the second part of metadata is associated with the second layer of the hierarchical metadata structure, wherein the second layer corresponds to a lower layer than the first layer in the hierarchical data structure; and
a memory that stores the hierarchical data structure in association with the image in a storage unit operatively coupled to the electronic device,
wherein the first part of metadata comprises at least one of a photographic view, a photographic composition, a photographic date, a photographic time, a photographic location, a temperature when taking a photograph, a photographic illuminance, and camera settings, and
wherein the second part of metadata comprises at least one of identification information of an image block included in the plurality of image blocks, size information of the image block, location information of the image block, color information of the image block, brightness information of the image block, depth information of the image block, and the attribute information of the image block.

23. An electronic device comprising:
an image combining module executed by at least one processor that creates, based on at least a first image and a second image, a third image including at least part of the first image and at least part of the second image, and that creates metadata of the third image based on metadata of the first image and metadata of the second image;

a measuring module executed by the at least one processor that measures a distance value related to the first image;

a determination module executed by the at least one processor the determines an image attribute for at least one of a plurality of image blocks based on the distance value; and a memory that stores the metadata of the third image in association with the third image in a storage unit operatively coupled to the electronic device, wherein the metadata of the first image comprises a hierarchical data structure, a first part of metadata corresponding to the first image and a second part of metadata corresponding to each of the plurality of image blocks into which the first image is divided, wherein the first part of the metadata is associated with a first layer of the hierarchical data structure and the second part of metadata is associated with a second layer of the hierarchical metadata structure, wherein the second part of metadata is associated with the second layer of the hierarchical metadata structure, wherein the metadata of the third image comprises a third part of metadata corresponding to the third image and a fourth part of metadata corresponding to each of a plurality of image blocks into which the third image is divided, wherein the first part of metadata comprises at least one of a photographic view, a photographic composition, a photographic date, a photographic time, a photographic location, a temperature when taking a photograph, a photographic illuminance, and camera settings, and wherein the second part of metadata comprises at least one of identification information of an image block included in the plurality of image blocks, size information of the image block, location information of the image block, color information of the image block, brightness information of the image block, depth information of the image block, and the attribute information of the image block.

24. An electronic device comprising:

a receiver that receives a message requesting an image from an external device, a measured distance value related to the image, and a determined image attribute for at least one of a plurality of image blocks based on the distance value;

a metadata obtaining module executed by the at least one processor that obtains a hierarchical data structure that includes a plurality of layers including at least a first layer and a second layer, wherein the hierarchical data structure is created so that a first part of metadata corresponding to the first image is associated with the first layer, and a second part of metadata corresponding to each of the plurality of image blocks into which the image is divided is associated with the second layer, wherein the second layer corresponds to a lower layer than the first layer in the hierarchical data structure; and a transmitter that transmits, to the external device, metadata associated with at least one layer corresponding to the external device from among the plurality of layers, as at least part of a reply in response to the request, based on the information related to the external device, wherein the first part of metadata comprises at least one of a photographic view, a photographic composition, a photographic date, a photographic time, a photographic location, a temperature when taking a photograph, a photographic illuminance, and camera settings, and wherein the second part of metadata comprises at least one of identification information of an image block included in the plurality of image blocks, size information of the image block, location information of the image block, color information of the image block, brightness information of the image block, depth information of the image block, and the attribute information of the image block.

* * * * *